(12) United States Patent
Dutta et al.

(10) Patent No.: US 12,143,216 B2
(45) Date of Patent: Nov. 12, 2024

(54) ENHANCEMENTS FOR BEAMFORMED SL GROUPCAST OVER MMW BANDS

(71) Applicant: QUALCOMM Incorporated, San Diego, CA (US)

(72) Inventors: Sourjya Dutta, San Diego, CA (US); Kapil Gulati, Belle Mead, NJ (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 374 days.

(21) Appl. No.: 17/452,386

(22) Filed: Oct. 26, 2021

(65) Prior Publication Data
US 2023/0132063 A1    Apr. 27, 2023

(51) Int. Cl.
*H04L 1/08* (2006.01)
*H04L 1/1812* (2023.01)

(52) U.S. Cl.
CPC .............. *H04L 1/08* (2013.01); *H04L 1/1812* (2013.01)

(58) Field of Classification Search
CPC ................................ H04L 1/08; H04L 1/1812
See application file for complete search history.

(56) References Cited

U.S. PATENT DOCUMENTS

| | | | |
|---|---|---|---|
| 11,050,543 B1 | 6/2021 | Balasubramanian et al. | |
| 2019/0053267 A1* | 2/2019 | Kim | H04W 76/14 |
| 2019/0320471 A1* | 10/2019 | Ohara | H04W 52/50 |
| 2019/0393989 A1* | 12/2019 | Jung | H04L 1/08 |
| 2020/0260231 A1* | 8/2020 | Ganesan | H04B 7/0695 |
| 2020/0313741 A1* | 10/2020 | Zhu | H04B 7/024 |
| 2021/0297199 A1* | 9/2021 | Miao | H04L 5/0048 |
| 2022/0217767 A1* | 7/2022 | Lee | H04W 72/1263 |
| 2022/0394700 A1* | 12/2022 | Ko | H04W 56/0045 |
| 2023/0199807 A1* | 6/2023 | Kang | H04W 72/40 370/329 |

FOREIGN PATENT DOCUMENTS

| | | | |
|---|---|---|---|
| WO | 2020064304 A1 | 4/2020 | |
| WO | 2021162509 A2 | 8/2021 | |
| WO | WO-2021162370 A1 * | 8/2021 | ........ H04W 56/0045 |

OTHER PUBLICATIONS

International Search Report and Written Opinion—PCT/US2022/042341—ISA/EPO—Dec. 5, 2022.

* cited by examiner

*Primary Examiner* — Yemane Mesfin
*Assistant Examiner* — Salma Ayad
(74) *Attorney, Agent, or Firm* — Procopio, Cory, Hargreaves & Savitch

(57) ABSTRACT

Methods, apparatuses, and computer-readable storage medium for SL communications are provided. An example method may include transmitting, to one or more UEs, an SL transmission in a first direction using a first precoder. The example method may further include retransmitting, to the one or more UEs based on a configured maximum number of directional retransmissions and without allocating additional processes and memory for the packet, the SL transmission in one or more directions different from the first direction using one or more precoders different from the first precoder based on a SL retransmission configuration.

30 Claims, 14 Drawing Sheets

ENHANCEMENTS FOR BEAMFORMED SL GROUPCAST OVER MMW BANDS

TECHNICAL FIELD

The present disclosure relates generally to communication systems, and more particularly, to sidelink (SL) communication.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. Some aspects of wireless communication may include direct communication between devices based on sidelink. There exists a need for further improvements in sidelink technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus at a user equipment (UE) may be provided. The UE may transmit, to one or more UEs, an SL transmission in a first direction using a first precoder. The UE may retransmit, to the one or more UEs based on a configured maximum number of directional retransmissions and without allocating additional processes and memory for the packet, the SL transmission in one or more directions different from the first direction using one or more precoders different from the first precoder based on an SL retransmission configuration.

In another aspect of the disclosure, a method, a computer-readable medium, and an apparatus at a UE may be provided. The UE may receive, from a second UE, an SL transmission in a first direction based on a first precoder. The UE may receive, from the second UE based on a configured maximum number of directional retransmissions and without allocating additional processes and memory for the packet, one or more retransmissions of the SL transmission in one or more directions different from the first direction, the one or more retransmissions being based on one or more precoders different from the first precoder.

To the accomplishment of the foregoing and related ends, the one or more aspects include the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
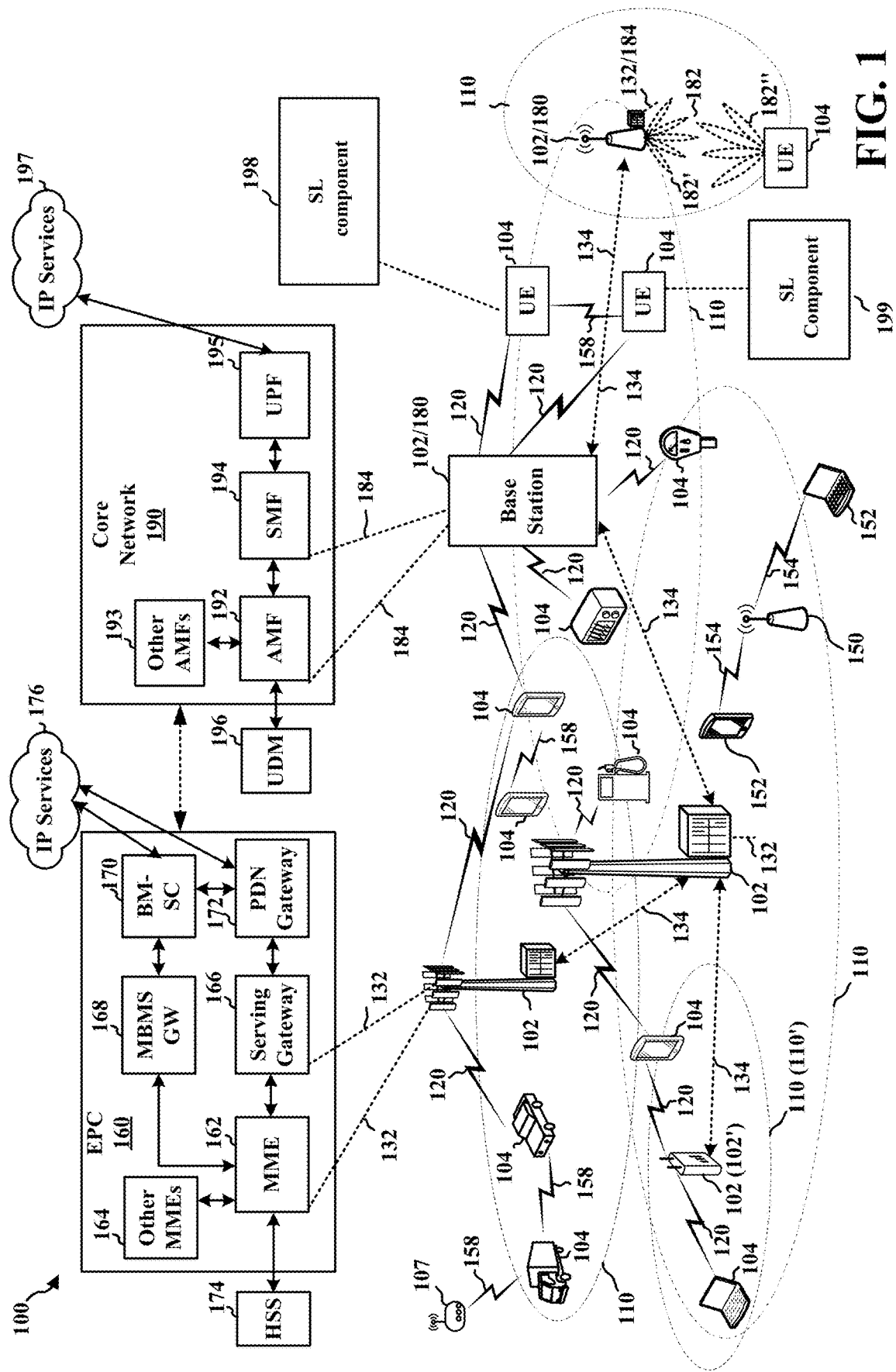
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can include a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

A link between a UE 104 and a base station 102 or 180 may be established as an access link, e.g., using a Uu interface. Other communication may be exchanged between wireless devices based on sidelink. For example, some UEs 104 may communicate with each other directly using a device-to-device (D2D) communication link 158. In some examples, the D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

Some examples of sidelink communication may include vehicle-based communication devices that can communicate from vehicle-to-vehicle (V2V), vehicle-to-infrastructure (V2I) (e.g., from the vehicle-based communication device to road infrastructure nodes such as a Road Side Unit (RSU)), vehicle-to-network (V2N) (e.g., from the vehicle-based communication device to one or more network nodes, such as a base station), vehicle-to-pedestrian (V2P), cellular vehicle-to-everything (C-V2X), and/or a combination thereof and/or with other devices, which can be collectively referred to as vehicle-to-anything (V2X) communications. Sidelink communication may be based on V2X or other D2D communication, such as Proximity Services (ProSe), etc. In addition to UEs, sidelink communication may also be transmitted and received by other transmitting and receiving devices, such as Road Side Unit (RSU) 107, etc. Sidelink communication may be exchanged using a PC5 interface, such as described in connection with the example in FIG. 2.

Figure 2:
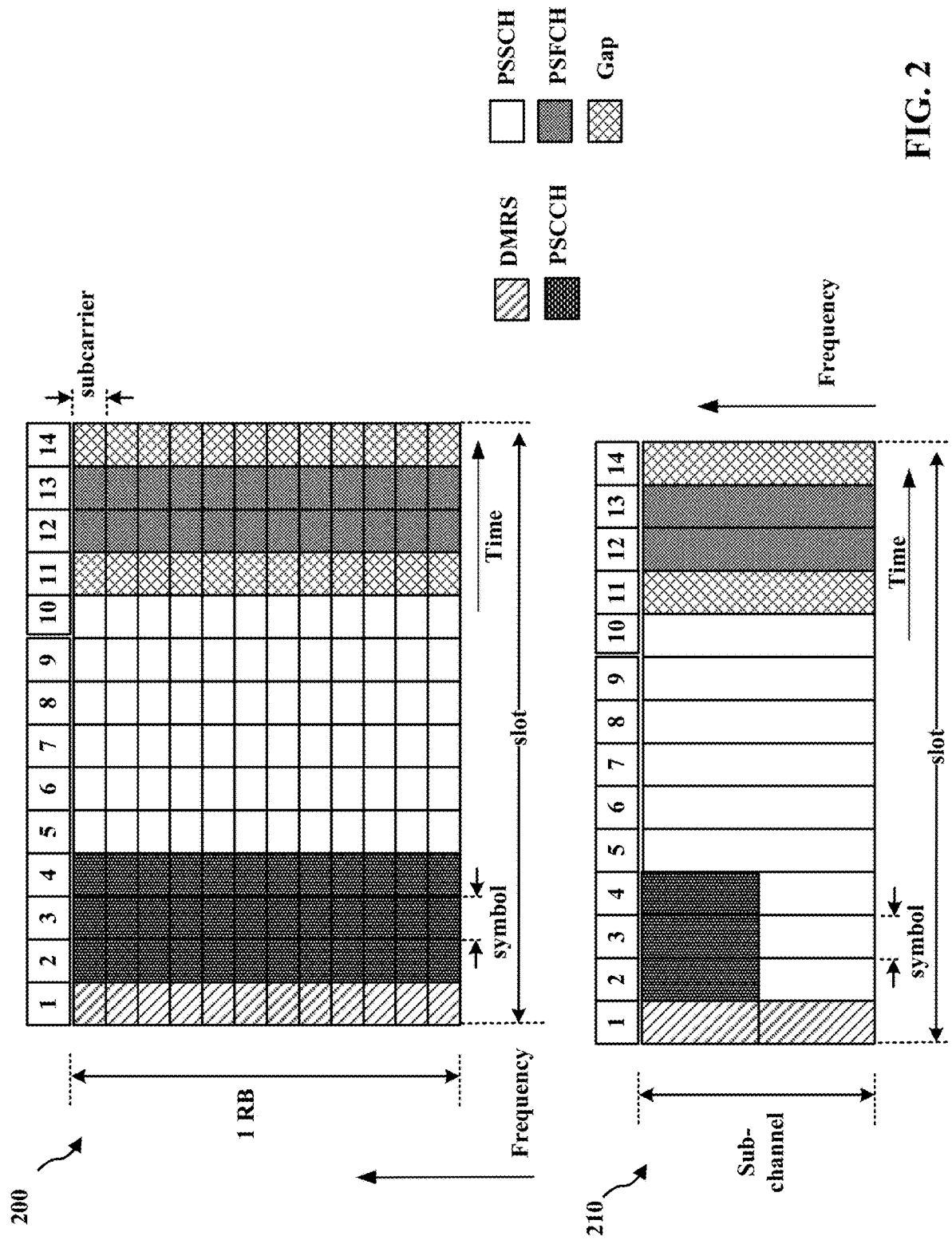
FIG. 2 illustrates example aspects of a sidelink slot structure.

Although the following description, including the example slot structure of FIG. 2, may provide examples for sidelink communication in connection with 5G NR, the concepts described herein may be applicable to other similar areas, such as LTE, LTE-A, CDMA, GSM, and other wireless technologies.

Referring again to FIG. 1, in certain aspects, a UE 104, or other device communicating based on sidelink, may include an SL component 198 configured to transmit, to one or more UEs, an SL transmission in a first direction using a first precoder. The SL component 198 may be further configured to retransmit, to the one or more UEs based on a configured maximum number of directional retransmissions and without allocating additional processes and memory for the packet, the SL transmission in one or more directions different from the first direction using one or more precoders different from the first precoder based on an SL retransmission configuration. In some aspects, the UE 104, or other device communicating based on sidelink, may include an SL component 199 configured to receive, from a second UE, an SL transmission in a first direction based on a first precoder. The SL component 199 may be further configured to receive, from the second UE based on a configured maximum number of directional retransmissions and without allocating additional processes and memory for the packet, one or more retransmissions of the SL transmission in one or more directions different from the first direction, the one or more retransmissions being based on one or more precoders different from the first precoder.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" (mmW) band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band. A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming. Similarly, beamforming may be applied for sidelink communication, e.g., between UEs.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same. Although this example is described for the base station 180 and UE 104, the aspects may be similarly applied between a first and second device (e.g., a first and second UE) for sidelink communication.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

FIG. 2 includes diagrams 200 and 210 illustrating example aspects of slot structures that may be used for sidelink communication (e.g., between UEs 104, RSU 107, etc.). The slot structure may be within a 5G/NR frame structure in some examples. In other examples, the slot structure may be within an LTE frame structure. Although the following description may be focused on 5G NR, the concepts described herein may be applicable to other similar areas, such as LTE, LTE-A, CDMA, GSM, and other wireless technologies. The example slot structure in FIG. 2 is merely one example, and other sidelink communication may have a different frame structure and/or different channels for sidelink communication. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. Diagram 200 illustrates a single resource block of a single slot transmission, e.g., which may correspond to a 0.5 ms transmission time interval (TTI). A physical sidelink control channel may be configured to occupy multiple physical resource blocks (PRBs), e.g., 10, 12, 15, 20, or 25

PRBs. The PSCCH may be limited to a single sub-channel. A PSCCH duration may be configured to be 2 symbols or 3 symbols, for example. A sub-channel may include 10, 15, 20, 25, 50, 75, or 100 PRBs, for example. The resources for a sidelink transmission may be selected from a resource pool including one or more subchannels. As a non-limiting example, the resource pool may include between 1-27 subchannels. A PSCCH size may be established for a resource pool, e.g., as between 10-100% of one subchannel for a duration of 2 symbols or 3 symbols. The diagram 210 in FIG. 2 illustrates an example in which the PSCCH occupies about 50% of a subchannel, as one example to illustrate the concept of PSCCH occupying a portion of a subchannel. The physical sidelink shared channel (PSSCH) occupies at least one subchannel. The PSCCH may include a first portion of sidelink control information (SCI), and the PSSCH may include a second portion of SCI in some examples.

A resource grid may be used to represent the frame structure. Each time slot may include a resource block (RB) (also referred to as physical RBs (PRBs)) that extends 12 consecutive subcarriers. The resource grid is divided into multiple resource elements (REs). The number of bits carried by each RE depends on the modulation scheme. As illustrated in FIG. 2, some of the REs may include control information in PSCCH and some REs may include demodulation RS (DMRS). At least one symbol may be used for feedback. FIG. 2 illustrates examples with two symbols for a physical sidelink feedback channel (PSFCH) with adjacent gap symbols. A symbol prior to and/or after the feedback may be used for turnaround between reception of data and transmission of the feedback. The gap enables a device to switch from operating as a transmitting device to prepare to operate as a receiving device, e.g., in the following slot. Data may be transmitted in the remaining REs, as illustrated. The data may include the data message described herein. The position of any of the data, DMRS, SCI, feedback, gap symbols, and/or LBT symbols may be different than the example illustrated in FIG. 2. Multiple slots may be aggregated together in some aspects.

Figure 3:
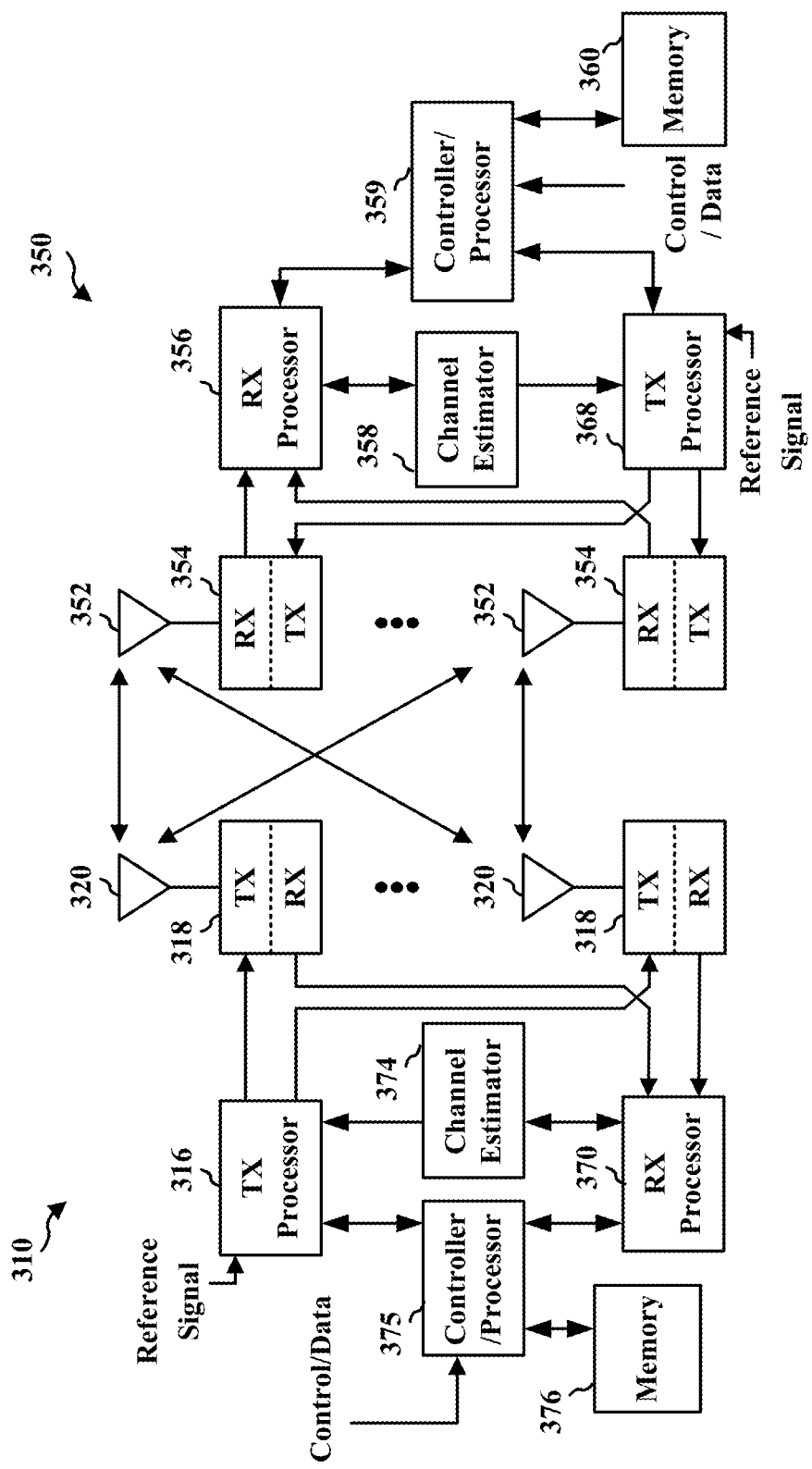
FIG. 3 is a diagram illustrating an example of a first device and a second device involved in wireless communication based, e.g., on sidelink.

FIG. 3 is a block diagram of a first wireless communication device 310 in communication with a second wireless communication device 350 based on sidelink. In some examples, the devices 310 and 350 may communicate based on V2X or other D2D communication. The communication may be based on sidelink using a PC5 interface. The devices 310 and the 350 may include a UE, an RSU, a base station, etc. Packets may be provided to a controller/processor 375 that implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the device 350. Each spatial stream may then be provided to a different antenna 320 via a separate transmitter 318TX. Each transmitter 318TX may modulate an RF carrier with a respective spatial stream for transmission.

At the device 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the device 350. If multiple spatial streams are destined for the device 350, they may be combined by the RX processor 356 into a single OFDM symbol stream. The RX processor 356 then converts the OFDM symbol stream from the time-domain to the frequency domain using a Fast Fourier Transform (FFT). The frequency domain signal includes a separate OFDM symbol stream for each subcarrier of the OFDM signal. The symbols on each subcarrier, and the reference signal, are recovered and demodulated by determining the most likely signal constellation points transmitted by device 310. These soft decisions may be based on channel estimates computed by the channel estimator 358. The soft decisions are then decoded and deinterleaved to recover the data and control signals that were originally transmitted by device 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. The controller/processor 359 may provide demultiplexing between transport and logical channels, packet reassembly, deciphering, header decompression, and control signal processing. The controller/processor 359 is also responsible for error detection using an ACK and/or NACK protocol to support HARQ operations.

Similar to the functionality described in connection with the transmission by device 310, the controller/processor 359 may provide RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by device 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The transmission is processed at the device 310 in a manner similar to that described in connection with the receiver function at the device 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. The controller/processor 375 provides demultiplexing between transport and logical channels, packet reassembly, deciphering, header decompression, control signal processing. The controller/processor 375 is also responsible for error detection using an ACK and/or NACK protocol to support HARQ operations.

At least one of the TX processor 368, the RX processor 356, and the controller/processor 359 may be configured to perform aspects in connection with SL component 198 of FIG. 1.

At least one of the TX processor 368, the RX processor 356, and the controller/processor 359 may be configured to perform aspects in connection with SL component 199 of FIG. 1.

Figure 4:
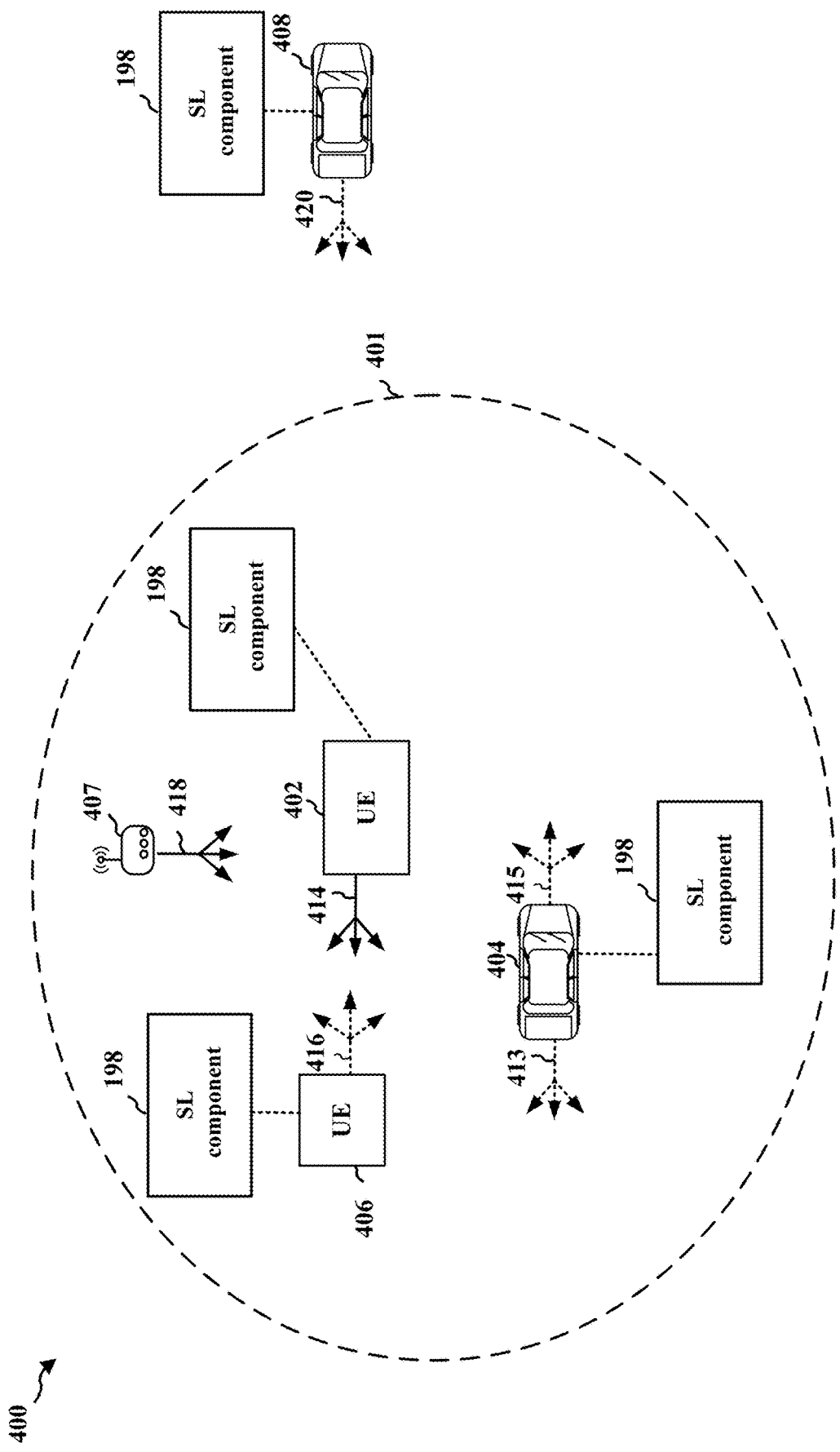
FIG. 4 illustrates example aspects of sidelink communication between devices, in accordance with aspects presented herein.

FIG. 4 illustrates an example 400 of sidelink communication between devices. The communication may be based on a slot structure including aspects described in connection with FIG. 2. For example, the UE 402 may transmit a sidelink transmission 414, e.g., including a control channel (e.g., PSCCH) and/or a corresponding data channel (e.g., PSSCH), that may be received by UEs 404, 406, 408. A control channel may include information (e.g., sidelink control information (SCI)) for decoding the data channel including reservation information, such as information about time and/or frequency resources that are reserved for the data channel transmission. For example, the SCI may indicate a number of TTIs, as well as the RBs that will be occupied by the data transmission. The SCI may also be used by receiving devices to avoid interference by refraining from transmitting on the reserved resources. The UEs 402, 404, 406, 408 may each be capable of sidelink transmission in addition to sidelink reception. Thus, UEs 404, 406, 408 are illustrated as transmitting sidelink transmissions 413, 415, 416, 420. The sidelink transmissions 413, 414, 415, 416, 420 may be unicast, broadcast, or multicast to nearby devices. For example, UE 404 may transmit transmissions 413, 415 intended for receipt by other UEs within a range 401 of UE 404, and UE 406 may transmit transmission 416. Additionally/alternatively, RSU 407 may receive communication from and/or transmit transmission 418 to UEs 402, 404, 406, 408. One or more of the UEs 402, 404, 406, 408 or the RSU 407 may include a SL component 198 as described in connection with FIG. 1.

Sidelink communication may be based on different types or modes of resource allocation mechanisms. In a first resource allocation mode (which may be referred to herein as "Mode 1"), centralized resource allocation may be provided by a network entity. For example, a base station 102 or 180 may determine resources for sidelink communication and may allocate resources to different UEs 104 to use for sidelink transmissions. In this first mode, a UE receives the allocation of sidelink resources from the base station 102 or 180. In a second resource allocation mode (which may be referred to herein as "Mode 2"), distributed resource allocation may be provided. In Mode 2, each UE may autonomously determine resources to use for sidelink transmission. In order to coordinate the selection of sidelink resources by individual UEs, each UE may use a sensing technique to monitor for resource reservations by other sidelink UEs and may select resources for sidelink transmissions from unreserved resources. Devices communicating based on sidelink may determine one or more radio resources in the time and frequency domain that are used by other devices in order to select transmission resources that avoid collisions with other devices. The sidelink transmission and/or the resource reservation may be periodic or aperiodic, where a UE may reserve resources for transmission in a current slot and up to two future slots (as discussed below).

Thus, in the second mode (e.g., Mode 2), individual UEs may autonomously select resources for sidelink transmission, e.g., without a central entity such as a base station indicating the resources for the device. A first UE may reserve the selected resources in order to inform other UEs about the resources that the first UE intends to use for sidelink transmission(s).

In some examples, the resource selection for sidelink communication may be based on a sensing-based mechanism. For instance, before selecting a resource for a data transmission, a UE may first determine whether resources have been reserved by other UEs.

For example, as part of a sensing mechanism for resource allocation mode 2, the UE may determine (e.g., sense) whether the selected sidelink resource has been reserved by other UE(s) before selecting a sidelink resource for a data transmission. If the UE determines that the sidelink resource has not been reserved by other UEs, the UE may use the selected sidelink resource for transmitting the data, e.g., in a PSSCH transmission. The UE may estimate or determine which radio resources (e.g., sidelink resources) may be in-use and/or reserved by others by detecting and decoding sidelink control information (SCI) transmitted by other UEs. The UE may use a sensing-based resource selection algorithm to estimate or determine which radio resources are in-use and/or reserved by others. The UE may receive SCI from another UE that includes reservation information based on a resource reservation field included in the SCI. The UE may continuously monitor for (e.g., sense) and decode SCI from peer UEs. The SCI may include reservation information, e.g., indicating slots and RBs that a particular UE has selected for a future transmission. The UE may exclude resources that are used and/or reserved by other UEs from a set of candidate resources for sidelink transmission by the UE, and the UE may select/reserve resources for a sidelink transmission from the resources that are unused and therefore form the set of candidate resources. The UE may continuously perform sensing for SCI with resource reservations in order to maintain a set of candidate resources from which the UE may select one or more resources for a sidelink transmission. Once the UE selects a candidate resource, the UE may transmit SCI indicating its own reservation of the resource for a sidelink transmission. The number of resources (e.g., sub-channels per subframe) reserved by the UE may depend on the size of data to be transmitted by the UE. Although the example is described for a UE receiving reservations from another UE, the reservations may also be received from an RSU or other device communicating based on sidelink.

Figure 5:
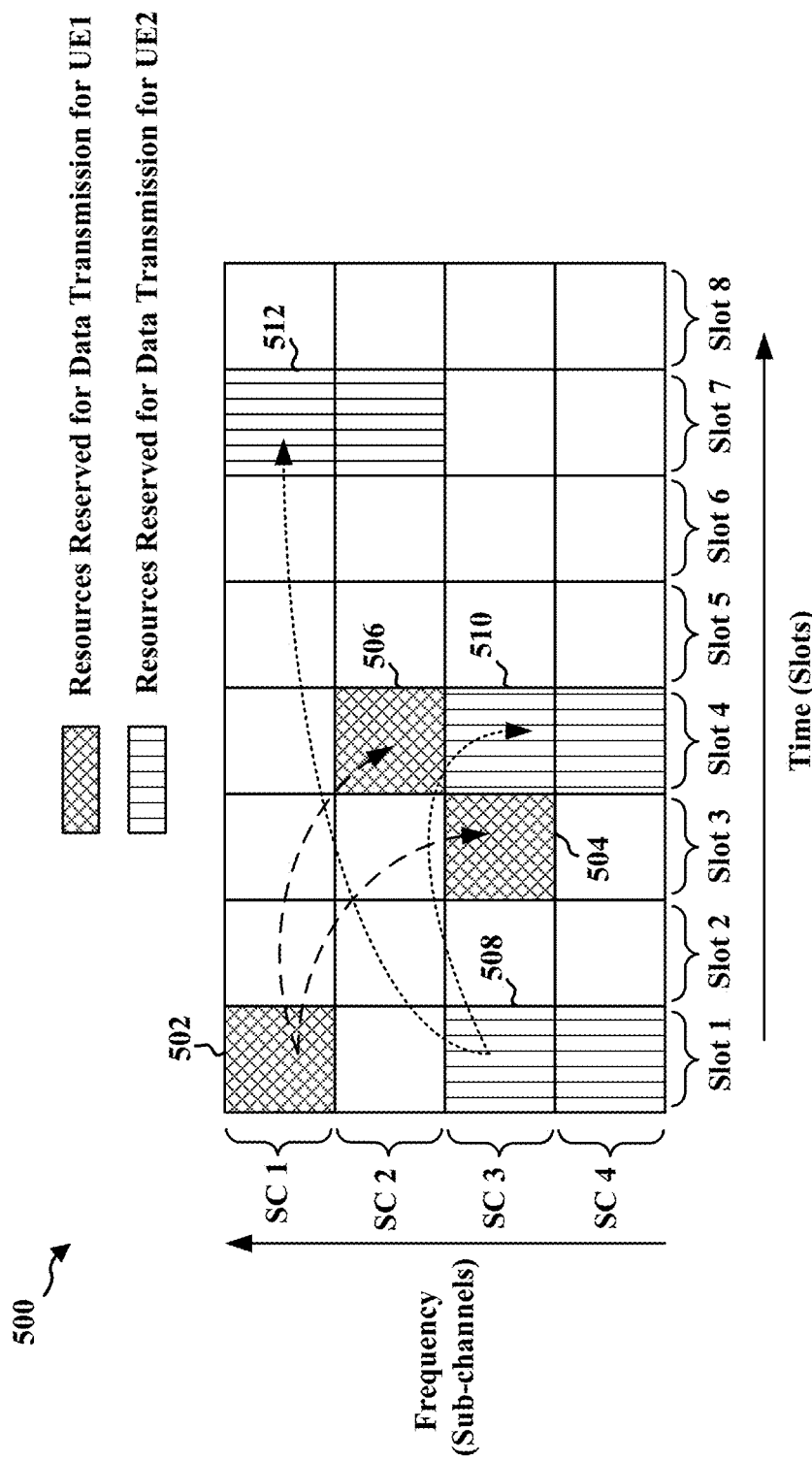
FIG. 5 illustrates examples of resource reservation for sidelink communication.

FIG. 5 is an example 500 of time and frequency resources showing reservations for sidelink transmissions. The resources may be included in a sidelink resource pool, for example. The resource allocation for each UE may be in units of one or more sub-channels in the frequency domain (e.g., sub-channels SC 1 to SC 4), and may be based on one slot in the time domain. The UE may also use resources in the current slot to perform an initial transmission, and may reserve resources in future slots for retransmissions. In this example, two different future slots are being reserved by UE1 and UE2 for retransmissions. The resource reservation may be limited to a window of pre-defined slots and sub-channels, such as a window including 8 time slots by 4 sub-channels, as shown in example 500, which provides 32 available resource blocks in total. This window may also be referred to as a resource selection window.

A first UE (UE1) may reserve a sub-channel (e.g., SC 1) in a current slot (e.g., slot 1) for its initial data transmission 502, and may reserve additional future slots within the window for data retransmissions (e.g., 504 and 506). For example, UE1 may reserve sub-channels SC 3 at slot 3 and SC 2 at slot 4 for future retransmissions as shown by FIG. 4. UE1 may then transmit information regarding which resources are being used and/or reserved by it to other UE(s). UE1 may do so by including the reservation information in the reservation resource field of the SCI, e.g., a first stage SCI.

FIG. 5 illustrates that a second UE (UE2) reserves resources in sub-channels SC 3 and SC 4 at time slot 1 for its current data transmission 508, and reserve first data retransmission 510 at time slot 4 using sub-channels SC 3 and SC 4, and reserve second data retransmission 512 at time slot 7 using sub-channels SC 1 and SC 2 as shown by FIG. 5. Similarly, UE2 may transmit the resource usage and reservation information to other UE(s), such as using the reservation resource field in SCI.

A third UE may consider resources reserved by other UEs within the resource selection window to select resources to transmit its data. The third UE may first decode SCIS within a time period to identify which resources are available (e.g., candidate resources). For example, the third UE may exclude the resources reserved by UE1 and UE2 and may select other available sub-channels and time slots from the candidate resources for its transmission and retransmissions, which may be based on a number of adjacent sub-channels in which the data (e.g., packet) to be transmitted can fit.

While FIG. 5 illustrates resources being reserved for an initial transmission and two retransmissions, the reservation may be for an initial transmission and a single transmission or for an initial transmission.

The UE may determine an associated signal measurement (such as RSRP) for each resource reservation received by another UE. The UE may consider resources reserved in a transmission for which the UE measures an RSRP below a threshold to be available for use by the UE. A UE may perform a signal/channel measurement for a sidelink resource that has been reserved and/or used by other UE(s), such as by measuring the RSRP of the message (e.g., the SCI) that reserves the sidelink resource. Based at least in part on the signal/channel measurement, the UE may consider using/reusing the sidelink resource that has been reserved by other UE(s). For example, the UE may exclude the reserved resources from a candidate resource set if the measured RSRP meets or exceeds the threshold, and the UE may consider a reserved resource to be available if the measured RSRP for the message reserving the resource is below the threshold. The UE may include the resources in the candidate resources set and may use/reuse such reserved resources when the message reserving the resources has an RSRP below the threshold, because the low RSRP indicates that the other UE is distant and a reuse of the resources is less likely to cause interference to that UE. A higher RSRP indicates that the transmitting UE that reserved the resources is potentially closer to the UE and may experience higher levels of interference if the UE selected the same resources.

For example, in a first step, the UE may determine a set of candidate resources (e.g., by monitoring SCI from other UEs and removing resources from the set of candidate resources that are reserved by other UEs in a signal for which the UE measures an RSRP above a threshold value). In a second step, the UE may select N resources for transmissions and/or retransmissions of a TB. As an example, the UE may randomly select the N resources from the set of candidate resources determined in the first step. In a third step, for each transmission, the UE may reserve future time and frequency resources for an initial transmission and up to two retransmissions. The UE may reserve the resources by transmitting SCI indicating the resource reservation. For example, in the example in FIG. 5, the UE may transmit SCI reserving resources for data transmission 508 and data retransmissions 510 and 512.

Figure 6:
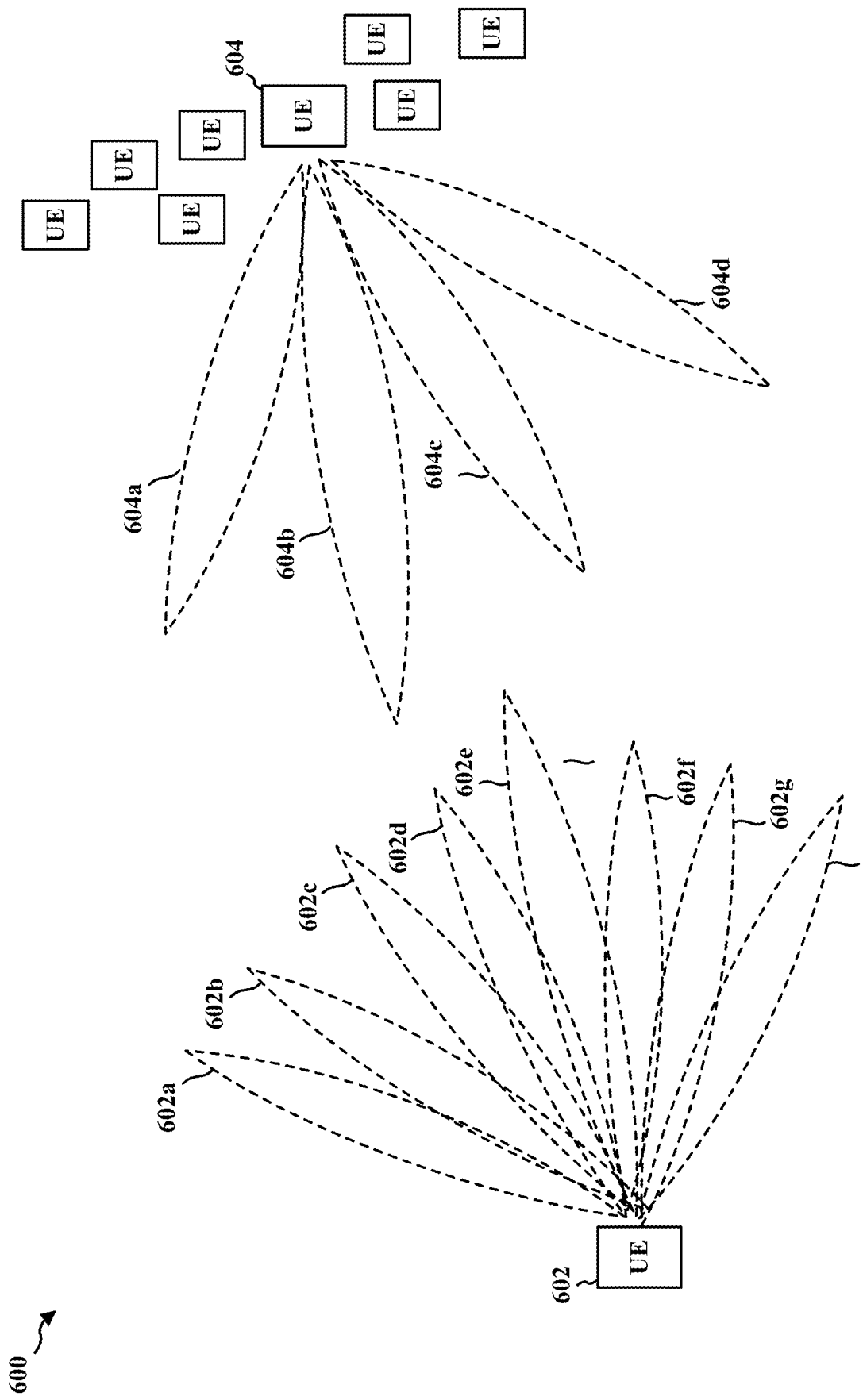
FIG. 6 is a diagram illustrating two UEs communicating with each other a set of beams.

FIG. 6 is a diagram 600 illustrating a UE 602 in communication with a UE 604 and one or more other UEs. The UE 604 is shown for illustrative purpose and other receiving UEs may follow a similar communication procedure. Referring to FIG. 6, the UE 602 may transmit a beamformed signal to the UE 604 in one or more of the directions 602a, 602b, 602c, 602d, 602e, 602f, 602g, 602h. The UE 604 may receive the beamformed signal from the UE 602 in one or more receive directions 604a, 604b, 604c, 604d. The UE 604 may also transmit a beamformed signal to the UE 602 in one or more of the directions 604a-604d. The UE 602 may receive the beamformed signal from the UE 604 in one or more of the receive directions 602a-602h. The UE 602/UE 604 may perform beam training to determine the best receive and transmit directions for each of the UE 602/UE 604. The transmit and receive directions for the UE 602 may or may not be the same. The transmit and receive directions for the UE 604 may or may not be the same. In some aspects, the UE 602 may be multicasting a same packet over various beams to different UEs, including the UE 604.

In response to different conditions, the UE 602 may determine to switch beams, e.g., between beams 602a-602h. The beam at the UE 602 may be used for reception of SL communication and/or transmission of SL communication for multicasting. In some examples, the UE 604 may send a transmission that triggers a beam switch by the UE 602. For example, the UE 604 may indicate a transmission configuration indication (TCI) state change, and in response, the UE 602 may switch to a new beam for the new TCI state of the UE 604. In some instances, a UE may receive a signal, from a UE, configured to trigger a transmission configuration indication (TCI) state change via, for example, a MAC control element (CE) command.

In another aspect, a spatial relation change, such as a spatial relation update, may trigger the UE to switch beams. Beamforming may be applied to SL channels, such as a PSCCH, a PSFCH, or a PSSCH. Beamforming may configure one or more spatial relations between the SL signals. Spatial relation indicates that a UE may transmit the SL signal using the same beam as it used for receiving the corresponding SL signal.

SL communications may be transmitted and received over mmW bands such as 28 GHz, 47 GHz, 60 GHz, or the like. Radio signals over mmW bands may have a higher pathloss (e.g., the reduction in power density of the signal as it propagates through space) than radio signals over sub-6 GHz bands. Therefore, communications over mmW bands may be utilize beamforming and spatial filtering to achieve range or quality of service (QoS) specifications. However, an SL UE may not be able to beamform in one or more directions at one time. Therefore, for a selected beam of a transmitting UE, the packet being transmitted may reach UEs in the angular range of the beam without reaching other UEs. Similarly, a beamformed receiving UE may receive from a narrow angular range, resulting in spatial blindness.

Unicast communication links that are point-to-point may be established and maintained via a beam search and beam management. One-to-many communication links, such as groupcast or broadcast communication links, may involve a packet being transmitted over an entire angular range or multiple directions. For sub-6 GHz communications, near omnidirectional transmission may be achieved using one or just a few antennas. However, for mmW communications, transmitting a packet over an entire angular range or multiple directions may use more antennas and more battery power for a UE.

In some wireless communication systems, SL broadcast or groupcast transmissions may not be able to cycle through precoders (e.g., beamforming vectors). Precoding may be a generalization of beamforming to support multi-stream (or multi-layer) transmission in multi-antenna wireless communications. In single-stream beamforming, the same signal may be emitted from each of the transmit antennas with an assigned weighting (e.g., phase and gain) such that the signal power is maximized at the receiver output. When the receiver has multiple antennas, single-stream beamforming may not simultaneously maximize the signal level at all of the receiving antennas. Therefore, precoders may be used to assign a weight to each information stream. Examples of precoding may include linear and non-linear precoding, such as maximum ratio transmission precoding, zero-forcing precoding, transmit Wiener precoding, dirty paper precoding, or the like. In some wireless communication systems, an SL UE may transmit in one beam direction, and if no NACK is received in that direction, the SL UE may clear a HARQ buffer. The SL UE may not be able to change the precoder and transmit the same packet in another direction.

In some wireless communication systems, precoder cycling for the same packet which enables a UE to transmit the same packet using different precoders may be enabled via medium access control (MAC) layer-based packet duplications. In some other wireless communication systems, precoder cycling for the same packet may be enabled via packet duplication at other higher layers, such as the V2X layer, a service data adaptation protocol (SDAP) layer, or a packet data convergence protocol (PDCP) layer. With packet duplication, the layers at which duplication may be performed may be configured accordingly.

Aspects provided herein may enable a UE to broadcast or groupcast messages with transmission and retransmission over multiple directions based on a configured maximum number of directional retransmissions and without allocating additional processes and memory for the packet. The physical (PHY) layer and the MAC layer of the UE may handle the transmission and retransmission over multiple directions. The MAC layer may maintain a HARQ buffer and other information relevant to a packet even after receiving an ACK from a UE in one direction, and transmissions using multiple precoders may be treated as retransmissions of the same packet with the same HARQ process and such transmissions using multiple precoders may be combined and processed at a receiving UE. Such transmissions and retransmissions over multiple directions based on a configured maximum number of directional retransmissions and without allocating additional processes and memory for the packet may efficiently improve the reliability of the broadcast and groupcast messages, such as enhance the reliability for the broadcast and groupcast messages via mmW bands which may use various antennas.

Figure 7:
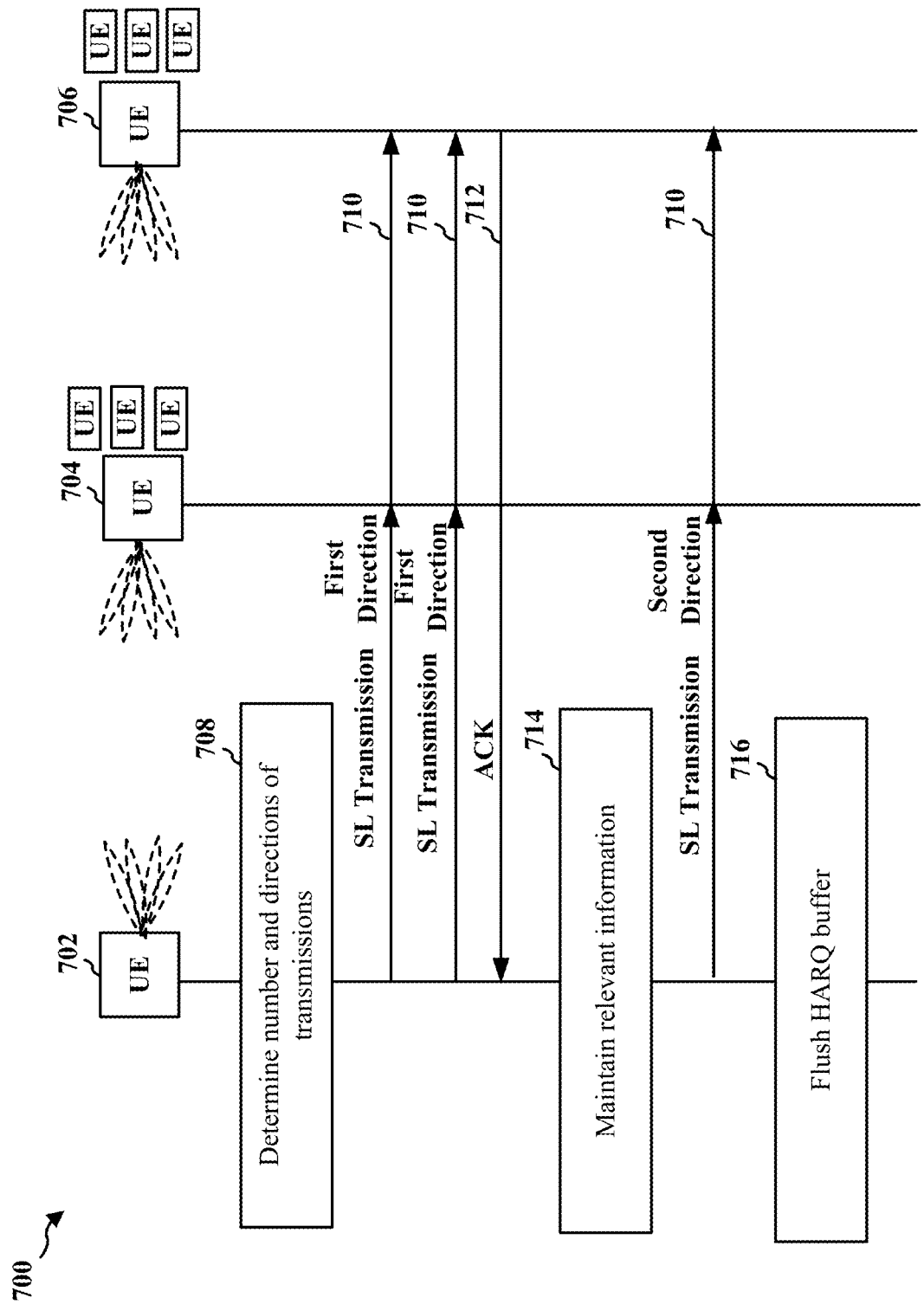
FIG. 7 is a diagram illustrating communication flow between several SL UEs.

FIG. 7 is a diagram 700 illustrating a communication flow between several SL UEs, including a first UE 702, a second UE 704, and a third UE 706. The UEs 702, 704, and 706 may communicate with each via one or more beams in one or more directions.

The UE 702 may plan to transmit an mmW groupcast or broadcast message in one or more SL transmissions 710. To transmit the groupcast or broadcast message, the UE 702 may, at 708, determine the numbers and directions of transmissions. In some aspects, the UE 702 may determine the numbers and directions of transmissions based on an upper layer indication, such as a MAC layer, PDCH layer, or an SDAP layer indication. In some aspects, the UE 702 may determine the numbers and directions of transmissions based on a configuration at the PHY layer. In some aspects, the UE 702 may be configured or indicated with a maximum number of retransmissions of a packet across all directions ($N_{Tx}^{max}$) and a number of transmission beam directions over which this packet may be transmitted ($N_{dir}$). In some aspects, the UE 702 may be configured or indicated with the maximum number of transmissions per direction per packet ($N_{Tx,dir}^{max}$) and the directions of transmissions ($N_{dir}$). In some aspects, the UE 702 may be configured or indicated with a maximum number of transmissions across all directions ($N_{Tx}^{max}$) and/or a maximum number of transmissions per direction per packet ($N_{Tx,dir}^{max}$).

In some aspects, one or more precoders associated with the SL transmission 710 may be indicated by upper layers, such as a MAC layer, a PDCH layer, or an SDAP layer, or may be based on a PHY layer implementation. In some aspects, the upper layer indication indicating one or more precoders may be based on directional information provided by an application layer. Each direction may be mapped to a precoder (at the PHY layer). In some aspects, the PHY layer may determine the precoders based on the range specifications, a number of transmissions available, or the like.

After determining the maximum number of transmissions per direction and the directions for the transmissions, the UE 702 may begin to transmit the SL transmission 710. In some aspects, for example, if $N_{Tx}^{max}$ is indicated, the UE 702 may determine $N_{Tx,dir}^{max}=N_{Tx}^{max}/N_{dir}$. In some aspects, the UE 702 may associate a packet of the SL transmission 710 with one HARQ process within the HARQ entity. The UE 702 may determine the first direction to transmit the SL transmission 710 and may set a HARQ process ID to p and a new data indicator (NDI) to 1. In some aspects, if $N_{Tx,dir}^{max}$ transmissions are reached, the UE 702 may disable HARQ feedback for the transmission. In some aspects, if the UE 702 receives a NACK or fails to receive an ACK from the UEs 704 or 706, the UE may retransmit the SL transmission 710 (retransmit the packet) and set an NDI to 0. In some aspects, if the UE 702 receives an ACK 712 from the UEs 704 or 706 or determines an ACK based on a lack of a NACK or if the number of retransmissions in the direction equals $N_{Tx,dir}^{max}$, the UE 702 may maintain relevant information at 714 (e.g., not flush the HARQ process buffer) and may proceed to determine a second direction and transmit the SL transmission 710 in a second direction. For the second direction, the UE 702 may set a HARQ process ID to p and an NDI to 0 for all the transmissions in the second direction. In some aspects, if an ACK is received and if the maximum number of directional transmissions $N_{dir}$ or if the maximum number of transmissions $N_{Tx}^{max}$ is reached, the UE 702 may flush (e.g., empty) the HARQ process buffer at 716. Alternatively, if an ACK is received and if neither the maximum number of directional transmissions $N_{dir}$ nor the maximum number of transmissions $N_{Tx}^{max}$ is reached, the UE 702 may not flush the HARQ process buffer.

A number N of transmissions take place with a single precoder before the precoder is switched, and the resource selection for the N transmissions with the single precoder may be based on a single direction resource selection mechanism for SL. The resource selection for subsequent transmissions may start either after the last $N_{Tx,dir}^{max}$ packet is transmitted in a direction or as an ACK is received (e.g., determined based on an ACK from all UEs in a direction). In some aspects, the UE 702 may indicate one or more future time and frequency resources selected for transmission over a particular direction in a first stage SCI. In some aspects, the UE 702 may not indicate the precoder in the first stage SCI. In some aspects, when the next transmission is known to be from a different precoder, the UE 702 may indicate the resource used for the transmissions and may further indicate the different precoder (or indicate that the precoder may be changed) in the reservation of resources in the first stage SCI.

Figure 8:
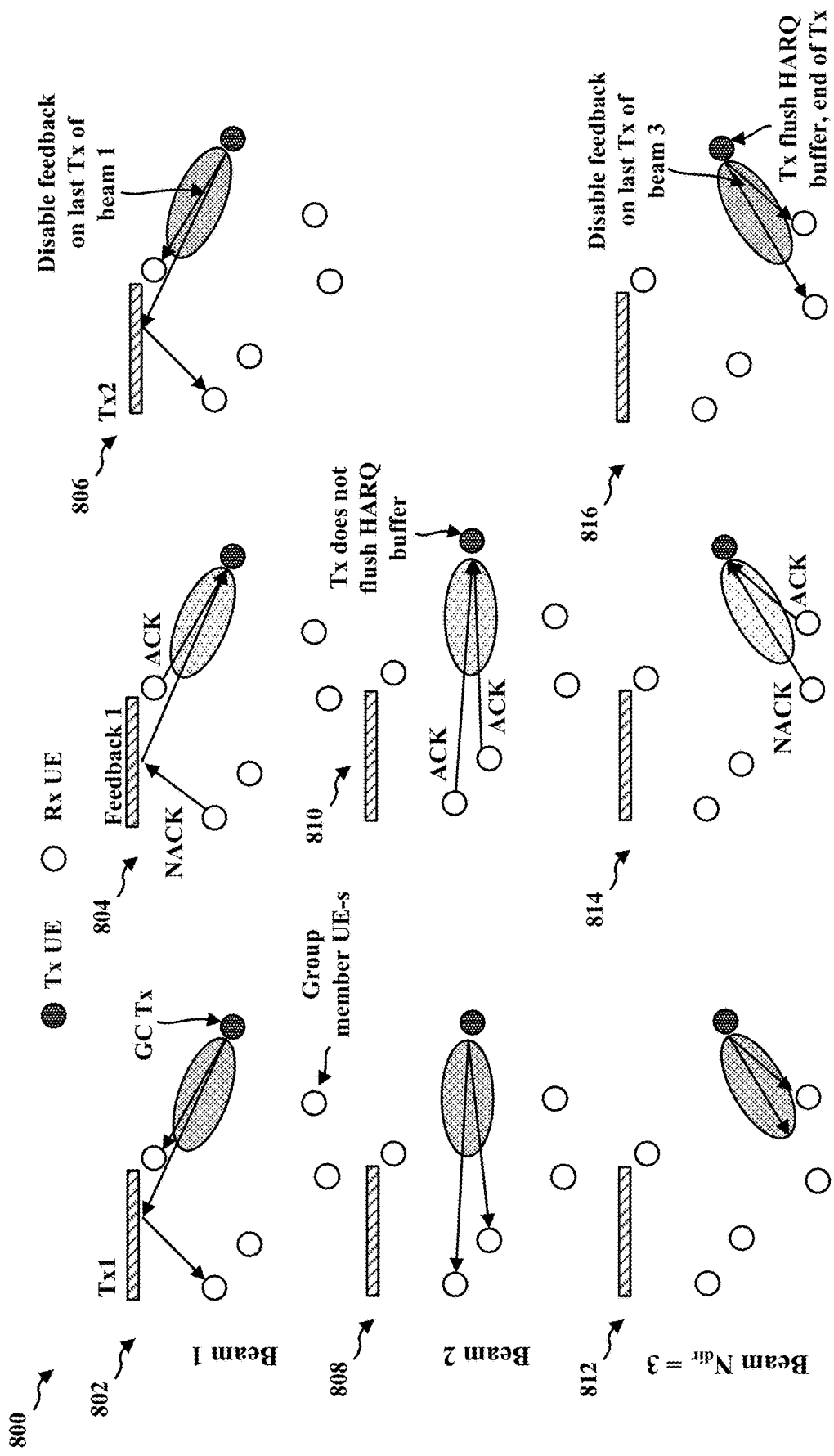
FIG. 8 is a diagram illustrating example SL transmissions and retransmissions via different beams in different directions.

FIG. 8 is a diagram 800 illustrating example SL transmissions and retransmissions via different beams in different directions to groupcast or broadcast one packet. At 802, the transmitting UE may transmit a first transmission in a first direction. At 804, the transmitting UE may receive feedback, such as an ACK from a first receiving UE and a NACK from a second receiving UE. At 806, the transmitting UE may transmit a second transmission in the first direction to the first receiving UE and the second receiving UE. If $N_{Tx,dir}^{max}$ transmissions are reached, the UE may disable HARQ feedback for the transmission. At 808, the UE may transmit two transmissions in a second direction. After receiving or determining ACK based on the two transmissions in the second direction, the UE may not flush a HARQ process buffer at 810. At 812, the transmitting UE may transmit two transmissions in a third direction. At 814, the transmitting UE may receive a NACK and an ACK based on the two transmissions in the third direction. At 816, the transmitting UE may retransmit in the third direction and flush a HARQ process buffer because the total transmission process has been completed.

In some aspects, the UE 702 may maintain, in local memory, a record (e.g., a table) for the number of transmissions made per direction and the last feedback result. The record may be initialized with 0 transmissions and no feedback or NACK for each direction. The data packet associated with the SL transmission 710 may be associated with a HARQ process p. The UE 702 may transmit the packet over a first direction with HARQ process ID set to p and NDI to 1. The UE 702 may accordingly receive feedback on the associated PSFCH resource and update the memory based on the feedback, and maintain the HARQ buffer after an ACK, such as ACK 712 is received. For example, the UE 702 may transmit a packet in the SL transmission 710 over a subsequent direction (n=2→$N_{dir}$) with a HARQ process ID set to p and an NDI set to 0. The UE 702 may again receive feedback on the associated PSFCH resource and update the memory based on the feedback. For example, the UE 702 may increment the number of transmissions and update the feedback result in the record. In some aspects, the UE 702 may again maintain the HARQ buffer after an ACK. In some aspects, if n=$N_{dir}$ (e.g., transmitted the SL transmission 710 in all the directions determined at 708), the UE 702 may determine whether additional transmissions may be performed based on the feedback in the record. If an ACK is received from all directions, the UE 702 may flush the HARQ process buffer and determine that the transmissions are completed for the packet. In some aspects, the UE 702 may determine one or more directions on which to retransmit and further perform transmissions with HARQ Process ID=p and NDI=0 until ACK is received from all directions. In some aspects, if $N_{Tx}^{max}$ is configured, the UE 702 may retransmit more than $N_{Tx}^{max}/N_{dir}$ in some directions (if the total retransmissions are below $N_{Tx}^{max}$) to enhance reliability on weaker links.

In some aspects, the UE 702 may select time and frequency resources for the SL transmission 710 for each of the directions before the first transmission occurs. In some aspects, the resources may be selected based on the received SCI and a beam sweeping pattern. For example, if the UE chooses two resources for each of four directions, the first resource of the first direction may be chosen within a window of $[1, W_{sel}]$ at a time $T_{1,1}$ with a PSFCH at $T_{1,1}^{f}$. The second resource of the first direction may then be chosen from a window $[T_{1,1}^{f}, W_{sel}]$. If the first resource for the fourth direction is chosen at $T_{4,1}$ with PSFCH at $T_{4,1}^{f}$, a second resource for the fourth direction may be chosen from the window $[T_{4,1}^{f}, W_{sel}]$. In some aspects, the UE 702 may indicate one or more time and frequency resources selected for the transmissions over a particular direction in a first stage SCI. In some aspects, the UE 702 may further indicate one or more time and frequency resources selected for the transmissions over another direction in the first stage SCI. In some aspects, the first stage SCI may further indicate that the another direction is associated with a different precoder.

Figure 9:
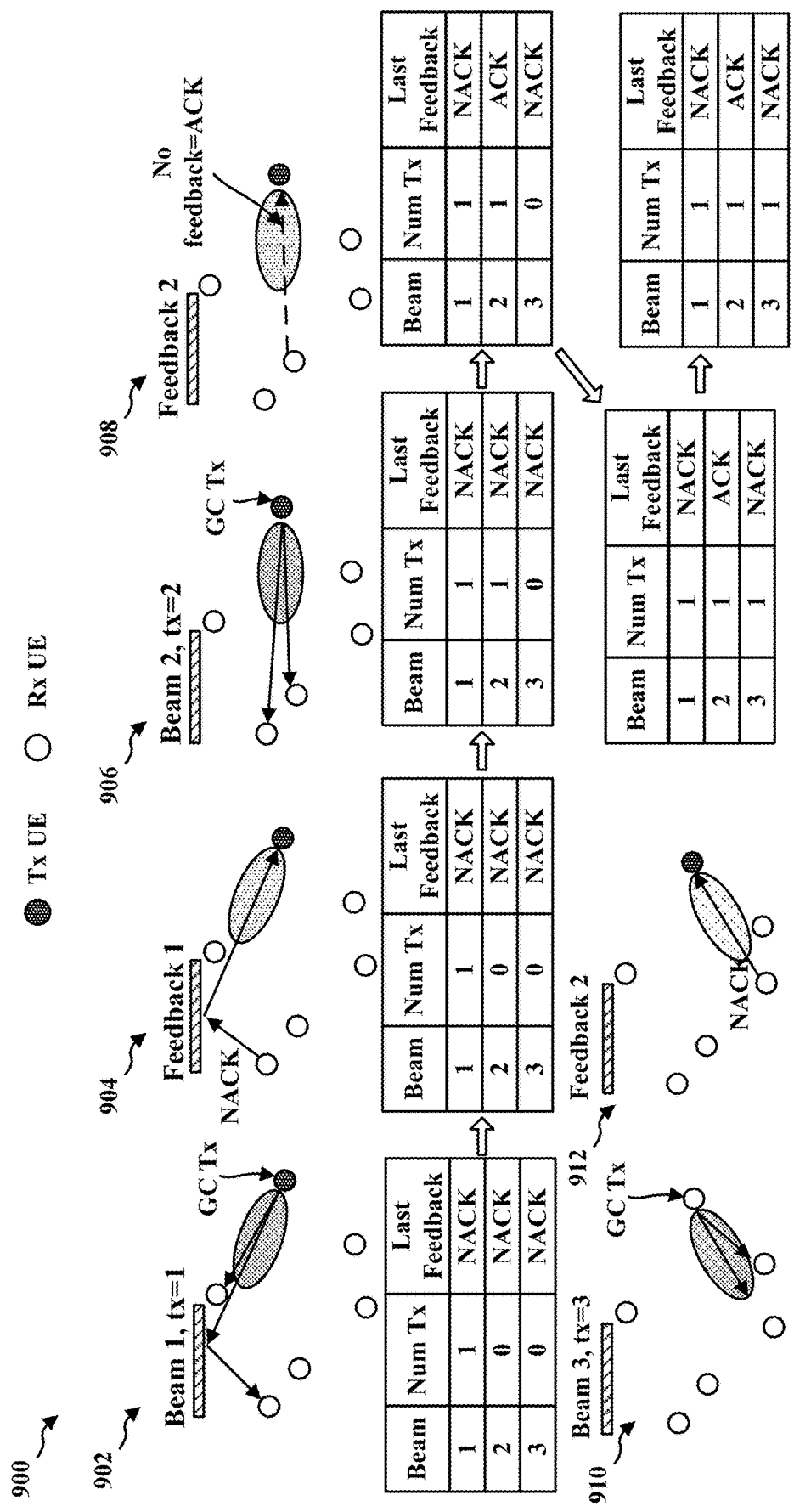
FIG. 9 is a diagram illustrating example SL transmissions and retransmissions via different beams in different directions.
Figure 10:
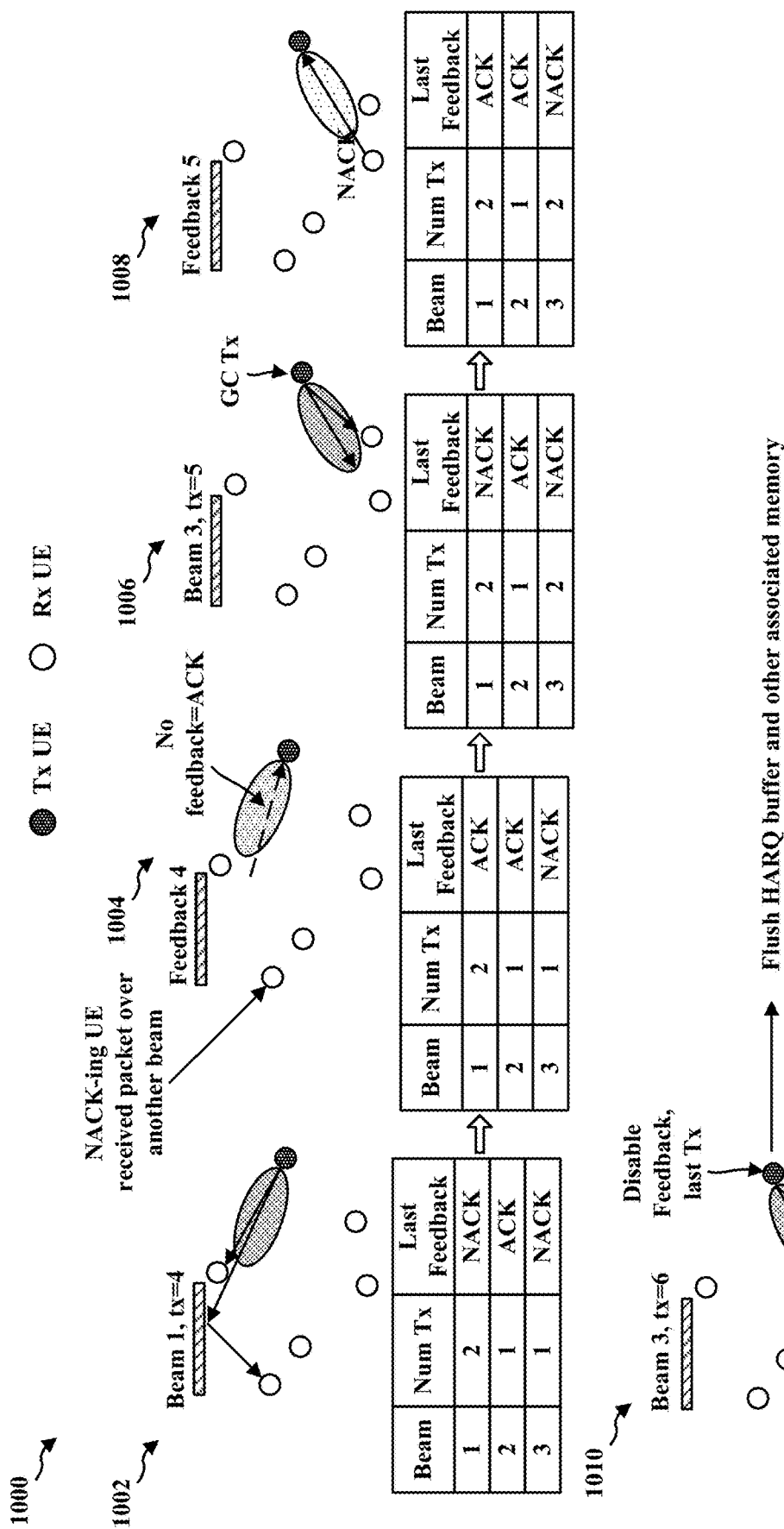
FIG. 10 is a diagram illustrating example SL transmissions and retransmissions via different beams in different directions.

FIGS. 9-10 are diagrams 900 and 1000 illustrating example SL transmissions and retransmissions via different beams in different directions to groupcast or broadcast one packet. At 902, the transmitting UE may transmit the packet in a first direction. The transmitting UE may accordingly update the record to represent that one transmission is made in direction 1 associated with beam 1 and the last feedback is a NACK. At 904, the transmitting UE may receive feedback, such as a NACK, in the first direction. Because the feedback received is a NACK, the record may still represent that one transmission is made in direction 1 associated with beam 1 and the last feedback is a NACK. At 906, the transmitting UE may transmit the packet in a second direction and may accordingly update the record to represent that one transmission is made in direction 2 associated with beam 2, and the last feedback in direction 2 is a NACK. Based on a lack of feedback at 908, the transmitting UE may consider the lack of feedback as an ACK and may accordingly update the record to represent that one transmission is made in direction 2 associated with beam 2, and the last feedback is an ACK. At 910, the transmitting UE may transmit the packet in a third direction and may accordingly update the record to represent that one transmission is made in direction 3 associated with beam 3, and the last feedback in direction 3 is a NACK. At 912, based on a NACK received, the record may still represent that one transmission is made in direction 3 associated with beam 3, and the last feedback in direction 3 is NACK. Continuing with FIG. 10, because the record represents that the last feedback in directions 1 and 3 associated with beams 1 and 3 is a NACK, the transmitting UE may continue to transmit the packet in directions 1 and 3. At 1002, the transmitting UE may again transmit the packet in the first direction and accordingly update the record to represent that two transmissions are made in the first direction. At 1004, based on a lack of feedback, the transmitting UE may determine that the packet is received by the receiving UE and update the record to represent that two transmissions are made in the first direction and the last feedback in direction 3 is an ACK. At 1006, the transmitting UE may again transmit the packet in the third direction and accordingly update the record to represent that two transmissions are made in the third direction. At 1008, the transmitting UE may again receive a NACK in the third direction. If the total number of transmissions across all directions is 6, at 1010, the transmitting UE may again transmit the packet in the third direction and determine that the total number of transmissions across all directions is reached, and accordingly flush the HARQ buffer, the record, and stop the transmission of the record.

Figure 11:
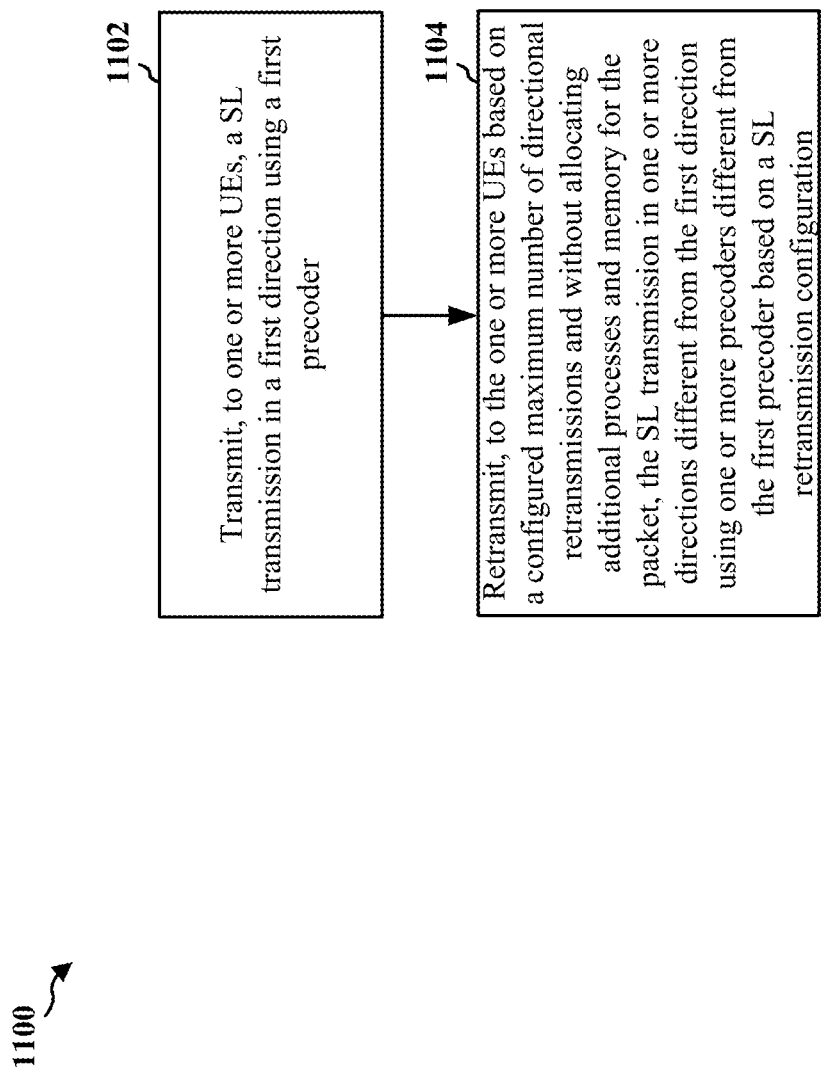
FIG. 11 is a flowchart of a method of wireless communication.

FIG. 11 is a flowchart 1100 of a method of wireless communication. The method may be performed by a UE (e.g., the UE 104, the UE 702; the apparatus 1402).

At 1102, the UE may transmit, to one or more UEs, an SL transmission in a first direction using a first precoder. For example, the UE 702 may transmit, to one or more UEs 704 and 706, an SL transmission 710 in a first direction using a first precoder. In some aspects, 1102 may be performed by SL component 1442 in FIG. 14.

At 1104, the UE may retransmit, to the one or more UEs based on a configured maximum number of directional retransmissions and without allocating additional processes and memory for the packet, the SL transmission in one or more directions different from the first direction using one or more precoders different from the first precoder based on an SL retransmission configuration. For example, the UE 702 may retransmit, to the one or more UEs 704 and 706 based on a configured maximum number of directional retransmissions and without allocating additional processes and memory for the packet, the SL transmission 710 in one or more directions different from the first direction using one or more precoders different from the first precoder based on an SL retransmission configuration. In some aspects, 1104 may be performed by SL component 1442 in FIG. 14.

Figure 12:
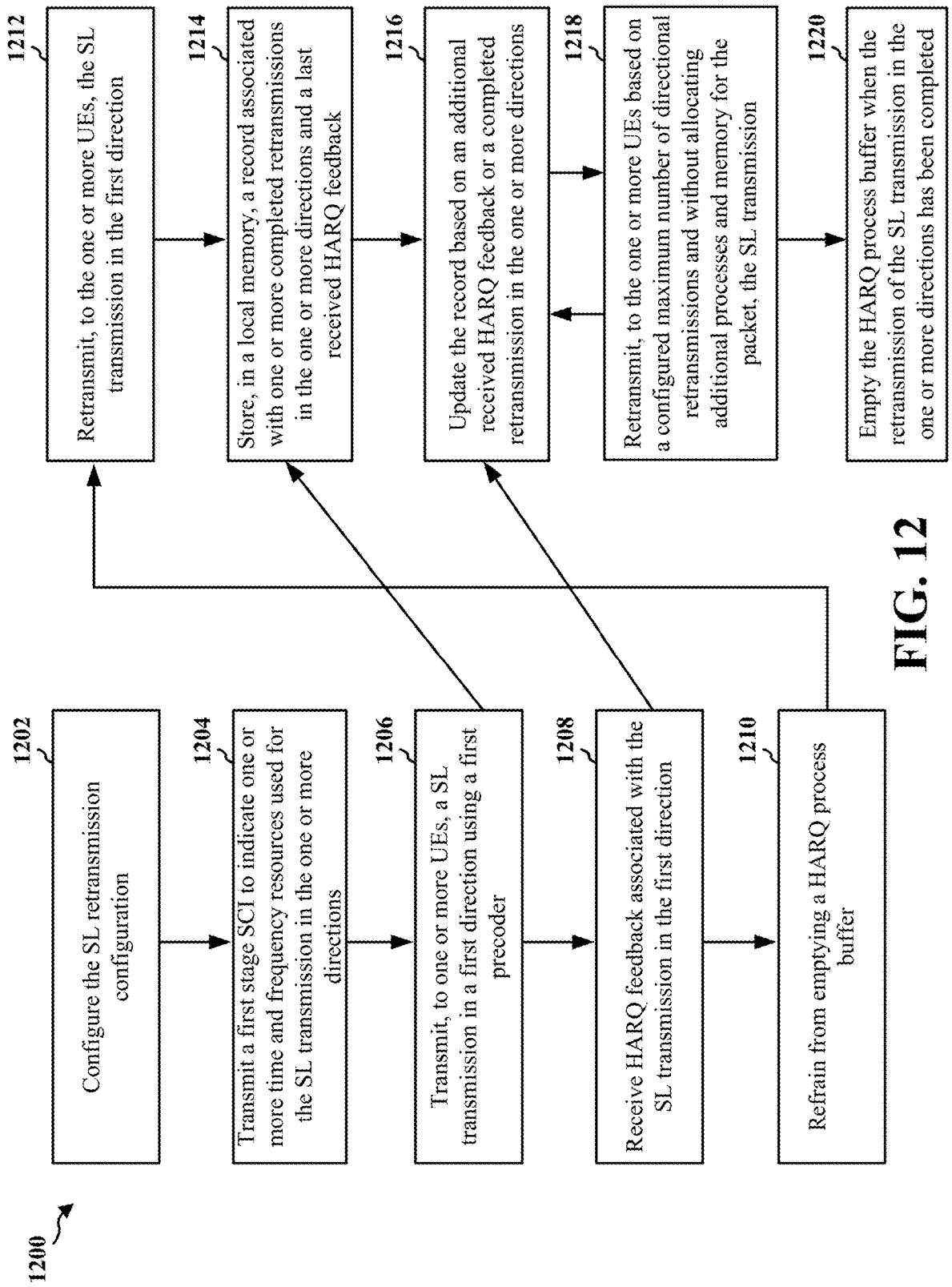
FIG. 12 is a flowchart of a method of wireless communication.

FIG. 12 is a flowchart 1200 of a method of wireless communication. The method may be performed by a UE (e.g., the UE 104, the UE 702; the apparatus 1402).

At 1202, the UE may configure the SL retransmission configuration. In some aspects, the UE may configure the SL retransmission configuration at an upper layer. In some aspects, the UE may configure the SL retransmission configuration at a PHY layer. For example, the UE 702 may configure the SL retransmission configuration at a PHY layer by determining a number and directions of transmissions at 708. In some aspects, 1202 may be performed by configuration component 1444 in FIG. 14. In some aspects, the SL retransmission configuration may include a maximum number of retransmissions across all of the one or more directions and a number of directions associated with the one or more directions. In some aspects, the SL retransmission configuration may include a maximum number of retransmissions associated with each of the one or more directions and a number of directions associated with the one or more directions. In some aspects, the SL retransmission configuration may map the one or more precoders to the one or more directions. In some aspects, the one or more precoders may be determined at a PHY layer based on at least one of: one or more range specifications or a number of directions associated with the one or more directions.

At 1204, the UE may transmit a first stage SCI to indicate one or more time and frequency resources used for the SL transmission in the one or more directions. For example, the UE 702 may transmit a first stage SCI to indicate one or more time and frequency resources used for the SL transmission in the one or more directions. In some aspects, 1204 may be performed by SL component 1442 in FIG. 14. In some aspects, the first stage SCI may further indicate that the one or more time and frequency resources are associated with the one or more precoders.

At 1206, the UE may transmit, to one or more UEs, an SL transmission in a first direction using a first precoder. For example, the UE 702 may transmit, to one or more UEs 704 and 706, an SL transmission 710 in a first direction using a first precoder. In some aspects, 1206 may be performed by SL component 1442 in FIG. 14.

At 1208, the UE may receive HARQ feedback associated with the SL transmission in the first direction. For example, the UE 702 may receive HARQ feedback (e.g., ACK 712) associated with the SL transmission in the first direction. In some aspects, the HARQ feedback is a HARQ ACK, and the UE may refrain from emptying a HARQ process buffer at 1210. For example, the UE 702 may refrain from emptying a HARQ process buffer at 714. In some aspects, the UE 702 may refrain from emptying a HARQ process buffer when the retransmission of the SL transmission in the one or more directions has not been completed. In some aspects, 1208 may be performed by the SL component 1442 in FIG. 14. In some aspects, 1210 may be performed by the buffer component 1446 in FIG. 14.

At 1212, the UE may retransmit, to the one or more UEs, the SL transmission in the first direction. For example, the UE 702 may retransmit, to the one or more UEs 704 and 706, the SL transmission 710 in the first direction. In some aspects, 1212 may be performed by the SL component 1442 in FIG. 14.

In some aspects, at 1214, the UE may store, in a local memory, a record associated with one or more completed retransmissions in the one or more directions and a last received HARQ feedback. For example, the UE 702 may store, in a local memory, a record associated with one or more completed retransmissions in the one or more directions and a last received HARQ feedback. In some aspects, 1214 may be performed by the record component 1448 in FIG. 14.

In some aspects, at 1216 the UE may update the record based on an additional received HARQ feedback or a completed retransmission in the one or more directions. For example, the UE 702 may update the record based on an additional received HARQ feedback or a completed retransmission in the one or more directions. In some aspects, 1216 may be performed by the record component 1448 in FIG. 14.

At 1218, the UE may retransmit, to the one or more UEs based on a configured maximum number of directional retransmissions and without allocating additional processes and memory for the packet, the SL transmission in one or more directions different from the first direction using one or more precoders different from the first precoder based on an SL retransmission configuration. For example, the UE 702 may retransmit, to the one or more UEs 704 and 706 based on a configured maximum number of directional retransmissions and without allocating additional processes and memory for the packet, the SL transmission 710 in one or more directions different from the first direction using one or more precoders different from an SL retransmission configuration. In some aspects, 1218 may be performed by SL component 1442 in FIG. 14. In some aspects, the SL transmission is retransmitted in at least one of the one or more directions based on the record.

In some aspects, at 1220, the UE may empty the HARQ process buffer when the retransmission of the SL transmission in the one or more directions has been completed. For example, the UE 702 may empty the HARQ process buffer when the retransmission of the SL transmission in the one or more directions has been completed at 716. In some aspects, 1220 may be performed by the buffer component 1446 in FIG. 14.

Figure 13:
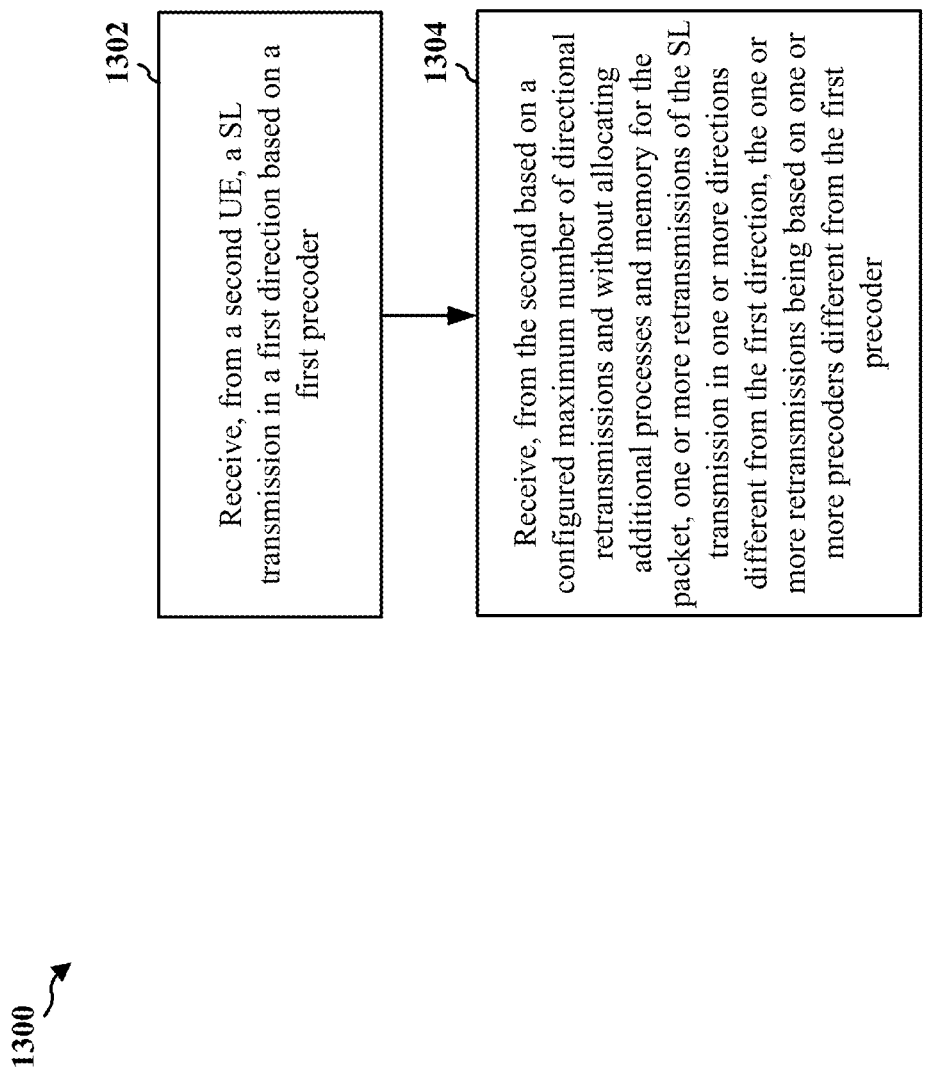
FIG. 13 is a flowchart of a method of wireless communication.

FIG. 13 is a flowchart 1300 of a method of wireless communication. The method may be performed by a UE (e.g., the UE 104, the UE 704, the UE 706; the apparatus 1402).

At 1302, the UE may receive, from a second UE, an SL transmission in a first direction based on a first precoder. For example, the UE 704 may receive, from a UE 702, an SL transmission 710 in a first direction based on a first precoder. In some aspects, 1302 may be performed by SL component 1442 in FIG. 14.

At 1304, the UE may receive, from the second UE based on a configured maximum number of directional retransmissions and without allocating additional processes and memory for the packet, one or more retransmissions of the SL transmission in one or more directions different from the first direction. The one or more retransmissions may be based on one or more precoders different from the first precoder. For example, the UE 704 may receive, from the UE 702 based on a configured maximum number of directional retransmissions and without allocating additional processes and memory for the packet, one or more retransmissions of the SL transmission 710 in one or more directions different from the first direction. In some aspects, 1304 may be performed by SL component 1442 in FIG. 14.

Figure 14:
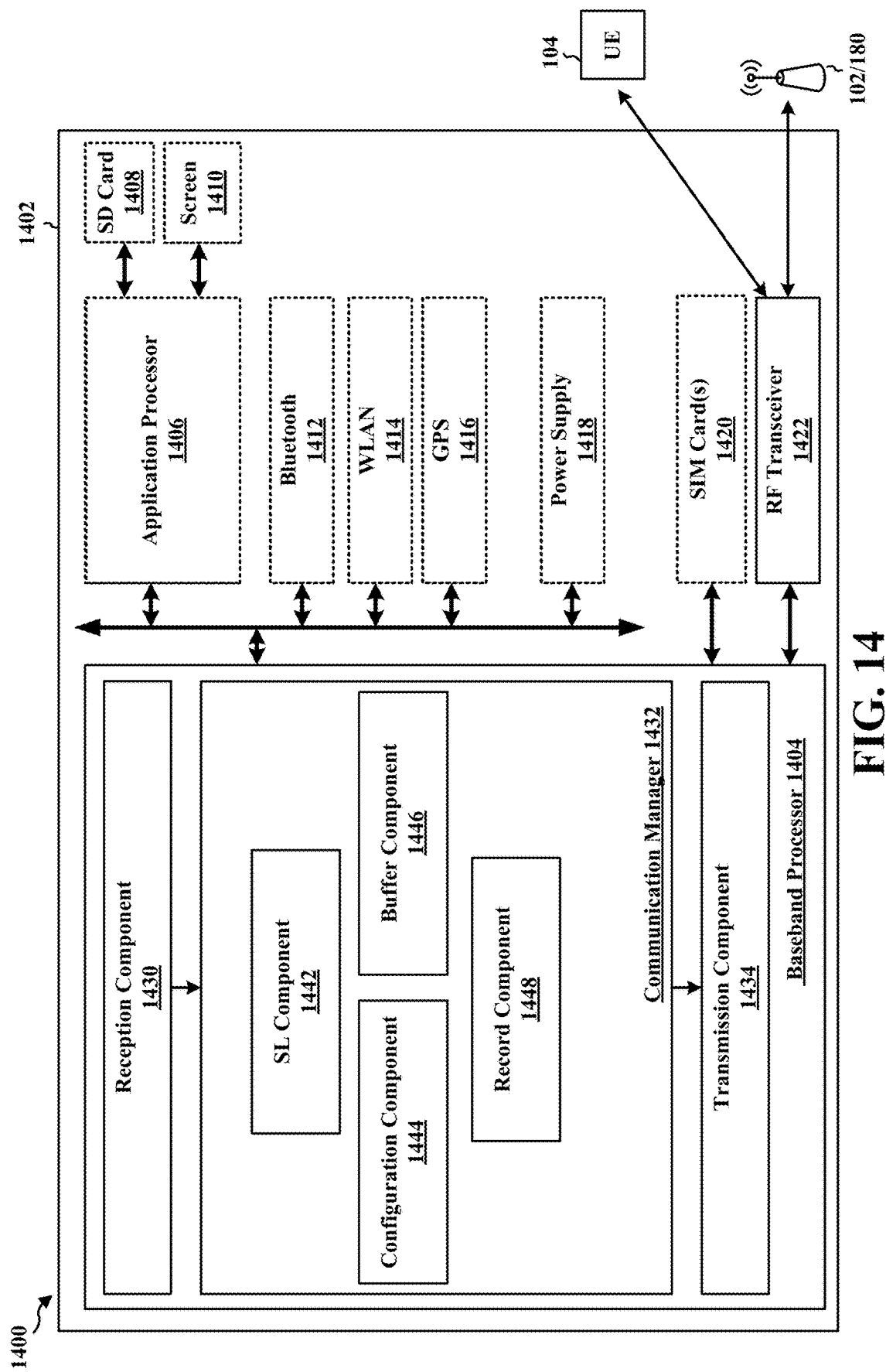
FIG. 14 is a diagram illustrating an example of a hardware implementation for an example apparatus.

FIG. 14 is a diagram 1400 illustrating an example of a hardware implementation for an apparatus 1402. The apparatus 1402 may be a UE, a component of a UE, or may implement UE functionality. In some aspects, the apparatus 1402 may include a cellular baseband processor 1404 (also referred to as a modem) coupled to a cellular RF transceiver 1422. In some aspects, the apparatus 1402 may further include one or more subscriber identity modules (SIM) cards 1420, an application processor 1406 coupled to a secure digital (SD) card 1408 and a screen 1410, a Bluetooth module 1412, a wireless local area network (WLAN) module 1414, a Global Positioning System (GPS) module 1416, or a power supply 1418. The cellular baseband processor 1404 communicates through the cellular RF transceiver 1422 with the UE 104 and/or BS 102/180. The cellular baseband processor 1404 may include a computer-readable medium/memory. The computer-readable medium/memory may be non-transitory. The cellular baseband processor 1404 is responsible for general processing, including the execution of software stored on the computer-readable medium/memory. The software, when executed by the cellular baseband processor 1404, causes the cellular baseband processor 1404 to perform the various functions described supra. The computer-readable medium/memory may also be used for storing data that is manipulated by the cellular baseband processor 1404 when executing software. The cellular baseband processor 1404 further includes a reception component 1430, a communication manager 1432, and a transmission component 1434. The communication manager 1432 includes the one or more illustrated components. The components within the communication manager 1432 may be stored in the computer-readable medium/memory and/or configured as hardware within the cellular baseband processor 1404. The cellular baseband processor 1404 may be a component of the UE 350 and may include the memory 360 and/or at least one of the TX processor 368, the RX processor 356, and the controller/processor 359. In one configuration, the apparatus 1402 may be a modem chip and include just the baseband processor 1404, and in another configuration, the apparatus 1402 may be the entire UE (e.g., see 350 of FIG. 3) and include the additional modules of the apparatus 1402.

The communication manager 1432 may include an SL component 1442 that is configured to transmit, to one or more UEs, an SL transmission in a first direction using a first precoder, e.g., as described in connection with 1102 in FIG. 11 or 1206 in FIG. 12. In some aspects, the SL component 1442 may be further configured to retransmit, to the one or more UEs based on a configured maximum number of directional retransmissions and without allocating additional processes and memory for the packet, the SL transmission in one or more directions different from the first direction using one or more precoders different from the first precoder based on an SL retransmission configuration, e.g., as described in connection with 1104 in FIG. 11 or 1218 in FIG. 12. In some aspects, the SL component 1442 may be further configured to transmit a first stage SCI to indicate one or more time and frequency resources used for the SL transmission in the one or more directions, e.g., as described in connection with 1204 in FIG. 12. In some aspects, the SL component 1442 may be further configured to retransmit, to the one or more UEs, the SL transmission in the first direction, e.g., as described in connection with 1212 in FIG. 12. In some aspects, the SL component 1442 may be further configured to receive, from a second UE, an SL transmission in a first direction based on a first precoder, e.g., as described in connection with 1302 in FIG. 13. In some aspects, the SL component 1442 may be further configured to receive, from the second UE based on a configured maximum number of directional retransmissions and without allocating additional processes and memory for the packet, one or more retransmissions of the SL transmission in one or more directions different from the first direction, the one or more retransmissions being based on one or more precoders different from the first precoder, e.g., as described in connection with 1304 in FIG. 13. In some aspects, the SL component 1442 may be further configured to receive HARQ feedback, e.g., as described in connection with 1208 in FIG. 12.

The communication manager 1432 may further include a configuration component 1444 that may be configured to configure the SL retransmission configuration, e.g., as described in connection with 1202 in FIG. 12. The communication manager 1432 may further include a buffer component 1446 that may be configured to refrain from emptying a HARQ process buffer, e.g., as described in connection with 1210 in FIG. 12. The buffer component 1446 may be further configured to empty the HARQ process buffer when the retransmission of the SL transmission in the one or more directions has been completed, e.g., as described in connection with 1220 in FIG. 12.

The communication manager 1432 may further include a record component 1448 that may be configured to store, in a local memory, a record associated with one or more completed retransmissions in the one or more directions and a last received HARQ feedback, e.g., as described in connection with 1202 in FIG. 12. The record component 1448 may be further configured to update the record based on an additional received HARQ feedback or a completed retransmission in the one or more directions, e.g., as described in connection with 1216 in FIG. 12.

The apparatus may include additional components that perform each of the blocks of the algorithm in the flowcharts of FIGS. 11-13. As such, each block in the flowcharts of FIGS. 11-13 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1402 may include a variety of components configured for various functions. In one configuration, the apparatus 1402, and in particular the cellular baseband processor 1404, may include means for transmitting, to one or more UEs, an SL transmission in a first direction using a first precoder. The cellular baseband processor 1404 may further include means for retransmitting, to the one or more UEs based on a configured maximum number of directional retransmissions and without allocating additional processes and memory for the packet, the SL transmission in one or more directions different from the first direction using one or more precoders different from the first precoder based on an SL retransmission configuration. The cellular baseband processor 1404 may further include means for configuring the SL retransmission configuration at an upper layer. The cellular baseband processor 1404 may further include means for configuring the SL retransmission configuration at a PHY layer. The cellular baseband processor 1404 may further include means for receiving HARQ feedback associated with the SL transmission in the first direction. The cellular baseband processor 1404 may further include means for refraining from emptying a HARQ process buffer. The cellular baseband processor 1404 may further include means for refraining from emptying a HARQ process buffer when the retransmission of the SL transmission in the one or more directions has not been completed and emptying the HARQ process buffer when the retransmission of the SL transmission in the one or more directions has been completed. The cellular baseband processor 1404 may further include means for transmitting a first stage SCI to indicate one or more time and frequency resources used for the SL transmission in the one or more directions. The cellular baseband processor 1404 may further include means for retransmitting, to the one or more UEs, the SL transmission in the first direction. The cellular baseband processor 1404 may further include means for storing, in a local memory, a record associated with one or more completed retransmissions in the one or more directions and a last received HARQ feedback. The cellular baseband processor 1404 may further include means for updating the record based on an additional received HARQ feedback or a completed retransmission in the one or more directions. The cellular baseband processor 1404 may further include means for refraining from retransmitting the SL transmission based on the record. The cellular baseband processor 1404 may further include means for emptying a HARQ process buffer. The cellular baseband processor 1404 may further include means for receiving, from a second UE, an SL transmission in a first direction based on a first precoder. The cellular baseband processor 1404 may further include means for receiving, from the second UE based on a configured maximum number of directional retransmissions and without allocating additional processes and memory for the packet, one or more retransmissions of the SL transmission in one or more directions different from the first direction, the one or more retransmissions being based on one or more precoders different from the first precoder. The means may be one or more of the components of the apparatus 1402 configured to perform the functions recited by the means. As described supra, the apparatus 1402 may include the TX Processor 368, the RX Processor 356, and the controller/processor 359. As such, in one configuration, the means may be the TX Processor 368, the RX Processor 356, and the controller/processor 359 configured to perform the functions recited by the means.

Aspects provided herein may enable a UE to broadcast or groupcast messages with transmission and retransmission over multiple directions based on a configured maximum number of directional retransmissions and without allocating additional processes and memory for the packet. The PHY layer and the MAC layer of the UE may handle the transmission and retransmission over multiple directions. The MAC layer may maintain a HARQ buffer and other information relevant to a packet even after receiving an ACK from a UE in one direction, and transmissions using multiple precoders may be treated as retransmission of the same packet with the same HARQ process and such transmissions using multiple precoders may be combined and processed at a receiving UE. Such transmission and retransmission over multiple directions based on a configured maximum number of directional retransmissions and without allocating additional processes and memory for the packet may efficiently improve the reliability of the broadcast and groupcast messages, such as enhance the reliability for the broadcast and groupcast messages via mmW bands which may use various antennas.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is an apparatus for wireless communication at a UE, comprising: a memory; and at least one processor coupled to the memory and configured to: transmit, to one or more UEs, a SL transmission in a first direction using a first precoder; and retransmit, to the one or more UEs based on a configured maximum number of directional retransmissions and without allocating additional processes and memory for the packet, the SL transmission in one or more directions different from the first direction using one or more precoders different from the first precoder based on a SL retransmission configuration.

Aspect 2 is the apparatus of aspect 1, wherein the at least one processor coupled to the memory is further configured to: configure the SL retransmission configuration at an upper layer.

Aspect 3 is the apparatus of any of aspects 1-2, wherein the at least one processor coupled to the memory is further configured to: configure the SL retransmission configuration at a PHY layer.

Aspect 4 is the apparatus of any of aspects 1-3, wherein the SL retransmission configuration comprises a maximum number of retransmissions across all of the one or more directions and a number of directions associated with the one or more directions.

Aspect 5 is the apparatus of any of aspects 1-4, wherein the SL retransmission configuration comprises a maximum number of retransmissions associated with each of the one or more directions and a number of directions associated with the one or more directions.

Aspect 6 is the apparatus of any of aspects 1-5, wherein the SL retransmission configuration maps the one or more precoders to the one or more directions.

Aspect 7 is the apparatus of any of aspects 1-6, wherein the one or more precoders are determined at a PHY layer based on at least one of: one or more range specifications or a number of directions associated with the one or more directions.

Aspect 8 is the apparatus of any of aspects 1-7, wherein the at least one processor coupled to the memory is further configured to: receive hybrid automatic repeat request (HARQ) feedback associated with the SL transmission in the first direction.

Aspect 9 is the apparatus of any of aspects 1-8, wherein the HARQ feedback is an HARQ ACK, and wherein the at least one processor coupled to the memory is further configured to: refrain from emptying a HARQ process buffer.

Aspect 10 is the apparatus of any of aspects 1-9, wherein the at least one processor coupled to the memory is further configured to: refrain from emptying a HARQ process buffer when the retransmission of the SL transmission in the one or more directions has not been completed and empty the HARQ process buffer when the retransmission of the SL transmission in the one or more directions has been completed.

Aspect 11 is the apparatus of any of aspects 1-10, wherein the at least one processor coupled to the memory is further configured to: transmit a first stage SL control information (SCI) to indicate one or more time and frequency resources used for the SL transmission in the one or more directions.

Aspect 12 is the apparatus of any of aspects 1-11, wherein the first stage SCI further indicates that the one or more time and frequency resources are associated with the one or more precoders.

Aspect 13 is the apparatus of any of aspects 1-12, wherein the at least one processor coupled to the memory is further configured to: retransmit, to the one or more UEs, the SL transmission in the first direction.

Aspect 14 is the apparatus of any of aspects 1-13, wherein the at least one processor coupled to the memory is further configured to: store, in a local memory, a record associated with one or more completed retransmissions in the one or more directions and a last received HARQ feedback.

Aspect 15 is the apparatus of any of aspects 1-14, wherein the at least one processor coupled to the memory is further configured to: update the record based on an additional received HARQ feedback or a completed retransmission in the one or more directions.

Aspect 16 is the apparatus of any of aspects 1-15, wherein the SL transmission is retransmitted in at least one of the one or more directions based on the record.

Aspect 17 is the apparatus of any of aspects 1-16, wherein the at least one processor coupled to the memory is further configured to: refrain from retransmitting the SL transmission based on the record; and empty a HARQ process buffer.

Aspect 18 is the apparatus of any of aspects 1-17, wherein the SL transmission is transmitted via a mmW band.

Aspect 19 is the apparatus of any of aspects 1-18, further comprising a transceiver coupled to the at least one processor, and wherein one or more time and frequency resources used for the SL transmission is selected before the SL transmission based on a SCI.

Aspect 20 is an apparatus for wireless communication at a first UE, comprising: a memory; and at least one processor coupled to the memory and configured to: receive, from a second UE, a SL transmission in a first direction based on a first precoder; and receive, from the second UE based on a configured maximum number of directional retransmissions and without allocating additional processes and memory for the packet, one or more retransmissions of the SL transmission in one or more directions different from the first direction, the one or more retransmissions being based on one or more precoders different from the first precoder.

Aspect 21 is the apparatus of aspect 21, further comprising a transceiver coupled to the at least one processor.

Aspect 22 is a method of wireless communication for implementing any of aspects 1 to 21.

Aspect 23 is an apparatus for wireless communication including means for implementing any of aspects 1 to 21.

Aspect 24 is a computer-readable medium storing computer executable code, where the code when executed by a processor causes the processor to implement any of aspects 1 to 21.

What is claimed is:

1. An apparatus for wireless communication at a user equipment (UE), comprising:
    memory; and
    at least one processor coupled to the memory and configured to:
        transmit, to one or more UEs via groupcasting, a sidelink (SL) transmission comprising at least one packet in a first direction using a first precoder; and
        retransmit, to the one or more UEs via groupcasting based on a configured maximum number of directional retransmissions and without allocating additional processes and memory for the at least one packet, the SL transmission based on a same hybrid automatic repeat request (HARQ) process identifier and in one or more directions different from the first direction using one or more precoders different from the first precoder based on a SL retransmission configuration, wherein the same HARQ process identifier is associated with the one or more directions, the first direction, the one or more precoders, and the first precoder.

2. The apparatus of claim 1, wherein the at least one processor coupled to the memory is further configured to:
    configure the SL retransmission configuration at an upper layer.

3. The apparatus of claim 1, wherein the at least one processor coupled to the memory is further configured to:
    configure the SL retransmission configuration at a physical (PHY) layer.

4. The apparatus of claim 1, wherein the SL retransmission configuration comprises a maximum number of retransmissions across all of the one or more directions and a number of directions associated with the one or more directions.

5. The apparatus of claim 1, wherein the SL retransmission configuration comprises a maximum number of retransmissions associated with each of the one or more directions and a number of directions associated with the one or more directions.

6. The apparatus of claim 1, wherein the SL retransmission configuration maps the one or more precoders to the one or more directions.

7. The apparatus of claim 1, wherein the one or more precoders are determined at a physical (PHY) layer based on at least one of: one or more range specifications or a number of directions associated with the one or more directions.

8. The apparatus of claim 1, wherein the at least one processor coupled to the memory is further configured to:
    receive HARQ feedback associated with the SL transmission in the first direction.

9. The apparatus of claim 8, wherein the HARQ feedback is an HARQ acknowledgment (ACK), and wherein the at least one processor coupled to the memory is further configured to:
    refrain from emptying a HARQ process buffer.

10. The apparatus of claim 1, wherein the at least one processor coupled to the memory is further configured to:
    refrain from emptying a HARQ process buffer when the retransmission of the SL transmission in the one or more directions has not been completed and empty the HARQ process buffer when the retransmission of the SL transmission in the one or more directions has been completed.

11. The apparatus of claim 1, wherein the at least one processor coupled to the memory is further configured to:
    transmit a first stage SL control information (SCI) to indicate one or more time and frequency resources used for the SL transmission in the one or more directions.

12. The apparatus of claim 11, wherein the first stage SCI further indicates that the one or more time and frequency resources are associated with the one or more precoders.

13. The apparatus of claim 1, wherein the at least one processor coupled to the memory is further configured to:
    retransmit, to the one or more UEs, the SL transmission in the first direction.

14. The apparatus of claim 1, wherein the at least one processor coupled to the memory is further configured to:
    store, in a local memory, a record associated with one or more completed retransmissions in the one or more directions and a last received HARQ feedback.

15. The apparatus of claim 14, wherein the at least one processor coupled to the memory is further configured to:
    update the record based on an additional received HARQ feedback or a completed retransmission in the one or more directions.

16. The apparatus of claim 15, wherein the SL transmission is retransmitted in at least one of the one or more directions based on the record.

17. The apparatus of claim 15, wherein the at least one processor coupled to the memory is further configured to:
    refrain from retransmitting the SL transmission based on the record; and
    empty a HARQ process buffer.

18. The apparatus of claim 1, wherein to transmit the SL transmission, the at least one processor coupled to the memory is configured to transmit the SL transmission via a millimeter wave (mmW) band.

19. The apparatus of claim 1, further comprising a transceiver coupled to the at least one processor, and wherein one or more time and frequency resources used for the SL transmission is selected before the SL transmission based on a sidelink control information (SCI).

20. An apparatus for wireless communication at a first user equipment (UE), comprising:
    memory; and
    at least one processor coupled to the memory and configured to:
        receive, from a second UE via groupcasting, a sidelink (SL) transmission comprising at least one packet in a first direction based on a first precoder; and
        receive, from the second UE via groupcasting based on a configured maximum number of directional retransmissions and without allocating additional processes and memory for the at least one packet, one or more retransmissions of the SL transmission based on a same hybrid automatic repeat request (HARQ) process identifier and in one or more directions different from the first direction, the one or more retransmissions being based on one or more precoders different from the first precoder, wherein the same HARQ process identifier is associated with the one or more directions, the first direction, the one or more precoders, and the first precoder.

21. The apparatus of claim 20, further comprising a transceiver coupled to the at least one processor.

22. A method for wireless communication at a user equipment (UE), comprising:

transmitting, to one or more UEs via groupcasting, a sidelink (SL) transmission comprising at least one packet in a first direction using a first precoder; and
retransmitting, to the one or more UEs via groupcasting based on a configured maximum number of directional retransmissions and without allocating additional processes and memory for the at least one packet, the SL transmission based on a same hybrid automatic repeat request (HARQ) process identifier and in one or more directions different from the first direction using one or more precoders different from the first precoder based on a SL retransmission configuration, wherein the same HARQ process identifier is associated with the one or more directions, the first direction, the one or more precoders, and the first precoder.

23. The method of claim 22, further comprising:
configuring the SL retransmission configuration at an upper layer.

24. The method of claim 22, further comprising:
configuring the SL retransmission configuration at a physical (PHY) layer.

25. The method of claim 22, wherein the SL retransmission configuration comprises a maximum number of retransmissions across all of the one or more directions and a number of directions associated with the one or more directions.

26. The method of claim 22, wherein the SL retransmission configuration comprises a maximum number of retransmissions associated with each of the one or more directions and a number of directions associated with the one or more directions.

27. The method of claim 22, wherein the SL retransmission configuration maps the one or more precoders to the one or more directions.

28. The method of claim 22, wherein the one or more precoders are determined at a physical (PHY) layer based on at least one of: one or more range specifications or a number of directions associated with the one or more directions.

29. The method of claim 22, further comprising:
receiving HARQ feedback associated with the SL transmission in the first direction.

30. A method for wireless communication at a first user equipment (UE), comprising:
receiving, from a second UE via groupcasting, a sidelink (SL) transmission comprising at least one packet in a first direction based on a first precoder; and
receiving, from the second UE via groupcasting based on a configured maximum number of directional retransmissions and without allocating additional processes and memory for the at least one packet, one or more retransmissions of the SL transmission based on a same hybrid automatic repeat request (HARQ) process identifier and in one or more directions different from the first direction, the one or more retransmission being based on one or more precoders different from the first precoder, wherein the same HARQ process identifier is associated with the one or more directions, the first direction, the one or more precoders, and the first precoder.

* * * * *